(12) United States Patent
Yuan et al.

(10) Patent No.: US 10,523,345 B2
(45) Date of Patent: Dec. 31, 2019

(54) METHODS AND APPARATUS FOR CALIBRATION AND ARRAY OPERATION IN ADVANCED MIMO SYSTEM

(71) Applicant: Samsung Electronics Co., Ltd, Suwon-si (KR)

(72) Inventors: Jin Yuan, Richardson, TX (US); Yang Li, Plano, TX (US); Gary Xu, Allen, TX (US); Robert Monroe, Melissa, TX (US); Jianzhong Zhang, Plano, TX (US); Sridhar Rajagopal, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/891,244

(22) Filed: Feb. 7, 2018

(65) Prior Publication Data

US 2018/0254839 A1    Sep. 6, 2018

Related U.S. Application Data

(60) Provisional application No. 62/467,458, filed on Mar. 6, 2017.

(51) Int. Cl.
*H04B 17/12* (2015.01)
*H04B 1/40* (2015.01)
(Continued)

(52) U.S. Cl.
CPC .............. *H04B 17/12* (2015.01); *H04B 1/40* (2013.01); *H04B 7/046* (2013.01); *H01Q 21/0025* (2013.01); *H04B 7/0684* (2013.01)

(58) Field of Classification Search
CPC ........ H04B 17/12; H04B 7/0456; H04B 1/40; H04B 7/06; H01Q 21/00
See application file for complete search history.

(56) References Cited

U.S. PATENT DOCUMENTS 1,548,957 A * 8/1925 Slobotkin ............... D06F 75/06
                                                              38/77.6
1,763,150 A * 6/1930 Hebrew ................ H01F 27/245
                                                              336/175
(Continued)

FOREIGN PATENT DOCUMENTS

CN    101064902 A    10/2007
CN    101729140 A    6/2010
(Continued)

OTHER PUBLICATIONS

International Search Report dated Jun. 14, 2018 in connection with International Patent Application No. PCT/KR2018/002669.
(Continued)

*Primary Examiner* — Berhanu Tadese

(57) ABSTRACT

Methods and Apparatuses for a transceiver calibration and antenna array operation in a multi-input multi-output (MIMO) system. One of the methods for operation of one or more of the apparatuses comprises sending a calibration signal and a pre-designed training sequence, via a coupling network, receiving a calibration signal and a pre-designed training sequence that is sent by the transceiver array in a time slotted pattern via a coupling network, generating an Rx calibration measurement ($R_1$) based on one or more uplink signals received via antenna array and the coupling network, generating a Tx calibration measurement ($T_1$) based on receipt of the calibration signal from each of antennas via the coupling network; and performing a joint Tx/Rx (TRx) calibration based on HR, $R_1$, and $T_1$, where H is a channel response in air interface, R is a channel response of receivers in transceiver array.

18 Claims, 17 Drawing Sheets

(51) Int. Cl.
    *H04B 7/0456*     (2017.01)
    *H01Q 3/26*     (2006.01)
    *H01Q 21/26*     (2006.01)
    *H01Q 21/28*     (2006.01)
    *H04B 17/21*     (2015.01)
    *H01Q 21/00*     (2006.01)
    *H04B 7/06*     (2006.01)
    *H04B 17/309*     (2015.01)
    *H04B 17/336*     (2015.01)

(56) References Cited

U.S. PATENT DOCUMENTS

| | | | |
|---|---|---|---|
| 5,248,982 A | 9/1993 | Reinhardt et al. | |
| 6,127,966 A | 10/2000 | Erhage | |
| 6,157,340 A * | 12/2000 | Xu | H01Q 3/2605 |
| | | | 342/174 |
| 6,157,343 A | 12/2000 | Andersson et al. | |
| 6,339,399 B1 * | 1/2002 | Andersson | H01Q 3/267 |
| | | | 342/174 |
| 6,496,140 B1 | 12/2002 | Alastalo | |
| 6,963,742 B2 * | 11/2005 | Boros | H01Q 1/246 |
| | | | 370/343 |
| 7,058,418 B2 * | 6/2006 | Doi | H01Q 3/2605 |
| | | | 342/372 |
| 7,212,784 B2 * | 5/2007 | Doi | H01Q 3/2605 |
| | | | 455/39 |
| 7,230,570 B2 * | 6/2007 | Thomas | H01Q 1/246 |
| | | | 342/372 |
| 7,392,015 B1 * | 6/2008 | Farlow | H04B 17/21 |
| | | | 342/387 |
| 7,764,935 B2 | 7/2010 | Pallonen et al. | |
| 7,965,991 B2 | 6/2011 | Nash et al. | |
| 8,154,452 B2 * | 4/2012 | Webb | H01Q 3/267 |
| | | | 342/174 |
| 8,193,971 B2 | 6/2012 | Vook et al. | |
| 9,113,346 B2 * | 8/2015 | Pivit | H01Q 3/267 |
| 9,402,192 B2 * | 7/2016 | Luo | H04B 17/12 |
| 10,003,388 B2 * | 6/2018 | Yilmaz | H04B 7/024 |
| 10,056,685 B2 * | 8/2018 | Haddad | H01Q 3/267 |
| 10,122,476 B2 * | 11/2018 | Sun | H04B 17/12 |
| 10,193,603 B2 * | 1/2019 | O'Keeffe | H01Q 1/246 |
| 2001/0016505 A1 | 8/2001 | Rexberg et al. | |
| 2003/0096638 A1 * | 5/2003 | Doi | H01Q 3/2605 |
| | | | 455/562.1 |
| 2003/0160719 A1 * | 8/2003 | Hancock | H01Q 1/246 |
| | | | 342/368 |
| 2005/0239506 A1 | 10/2005 | Li | |
| 2006/0044185 A1 * | 3/2006 | Jin | H01Q 3/267 |
| | | | 342/368 |
| 2006/0128436 A1 * | 6/2006 | Doi | H01Q 3/2605 |
| | | | 455/562.1 |
| 2009/0161819 A1 * | 6/2009 | Lewalter | A61B 6/032 |
| | | | 378/16 |
| 2010/0150013 A1 * | 6/2010 | Hara | H04L 25/0224 |
| | | | 370/252 |
| 2010/0321233 A1 * | 12/2010 | Ben-Zur | H01Q 3/267 |
| | | | 342/174 |
| 2012/0020396 A1 * | 1/2012 | Hohne | H01Q 3/267 |
| | | | 375/224 |
| 2013/0235962 A1 * | 9/2013 | O'Keefe | H01Q 3/267 |
| | | | 375/371 |
| 2014/0242914 A1 * | 8/2014 | Monroe | H04B 17/11 |
| | | | 455/63.4 |
| 2015/0222336 A1 * | 8/2015 | Yilmaz | H04B 7/024 |
| | | | 370/252 |
| 2015/0255868 A1 * | 9/2015 | Haddad | H01Q 3/267 |
| | | | 342/368 |
| 2016/0127003 A1 * | 5/2016 | Xu | H01Q 1/246 |
| | | | 455/562.1 |
| 2016/0135180 A1 * | 5/2016 | Yuan | H04B 7/0617 |
| | | | 370/329 |
| 2016/0197660 A1 * | 7/2016 | O'Keeffe | H01Q 1/246 |
| | | | 370/329 |
| 2016/0294488 A1 * | 10/2016 | Sun | H04B 17/12 |
| 2016/0344483 A1 * | 11/2016 | Kareisto | H04B 17/12 |
| 2018/0123707 A1 * | 5/2018 | Morishige | H04B 7/10 |
| 2018/0254839 A1 * | 9/2018 | Yuan | H01Q 3/2605 |
| 2019/0028155 A1 * | 1/2019 | Hofrichter | H04B 7/0417 |

FOREIGN PATENT DOCUMENTS

| | | | | |
|---|---|---|---|---|
| EP | 1187354 A1 * | 3/2002 | | H04W 52/42 |
| EP | 1548957 A1 * | 6/2005 | | H01Q 3/267 |
| EP | 1763150 A1 * | 3/2007 | | H04B 7/08 |
| EP | 2139070 A2 * | 12/2009 | | H01Q 3/2605 |
| EP | 1763150 B1 | 3/2015 | | |
| EP | 1548957 B1 | 7/2016 | | |
| WO | WO-2015133863 A1 * | 9/2015 | | H01Q 3/267 |
| WO | 2016/068591 A1 | 5/2016 | | |
| WO | WO-2016068591 A1 * | 5/2016 | | H01Q 1/246 |

OTHER PUBLICATIONS

Written Opinion of the International Searching Authority dated Jun. 14, 2018 in connection with International Patent Application No. PCT/KR2018/002669.

* cited by examiner

US 10,523,345 B2

METHODS AND APPARATUS FOR CALIBRATION AND ARRAY OPERATION IN ADVANCED MIMO SYSTEM

CROSS-REFERENCE TO RELATED APPLICATIONS AND CLAIM OF PRIORITY

The present application claims priority to U.S. Provisional Patent Application Ser. No. 62/467,458, filed on Mar. 6, 2017, entitled "Methods and Apparatus for Calibration and Array Operation in Advanced MIMO System." The content of the above-identified patent document is incorporated herein by reference.

TECHNICAL FIELD

The present application relates generally to large array operations in advanced wireless communication systems. More specifically, this disclosure relates to calibration and array operations for a full dimension multi-input multi-output (FD-MIMO).

BACKGROUND

Full-dimension MIMO (FD-MIMO) is a key technology introduced in 3GPP wireless communication systems to significantly increase system capacity. In FD-MIMO networks, an eNB deploys a large number of active antenna elements on a two-dimensional plane, i.e., a 2-dimensional (2D) active antenna array (AAA). With such antennas, an eNB can form beams steered towards angles on both horizontal and vertical directions, and is capable of supporting high-order MU-MIMO while fully exploiting spatial degrees of freedom. To realize the FD-MIMO gain, an eNB may acquire channel state information (CSI) of user equipments (UEs). For frequency division duplexing (FDD) systems, a CSI is acquired by training (e.g. via CSI reference signal (CSI-RS)) and feedback of precoding matrix indicator (PMI).

SUMMARY

The present disclosure relates to a pre-$5^{th}$-generation (5G) or 5G communication system to be provided for supporting higher data rates beyond $4^{th}$-generation (4G) communication system such as long term evolution (LTE). Embodiments of the present disclosure provide a calibration and array operation in advanced MIMO systems.

In one embodiment, an apparatus for a calibration and array operation in a multi-input multi-output (MIMO) system is provided. The apparatus includes an antenna array comprising a plurality of antennas, transceiver processing circuitry configured to generate an uplink channel measurement (HR) based on one or more uplink signals received via the antenna array, and a coupling network. The apparatus further includes a calibration system electrically connected to each of the antennas in the antenna array via the coupling network, the calibration system including calibration transmitter (Tx) configured to send a calibration signal via the coupling network for transmission by each of the antennas in the antenna array and a calibration receiver (Rx) processing circuitry configured to generate an Rx calibration measurement ($R_1$) based on the one or more uplink signals received via both the antenna array and the coupling network and generate a Tx calibration measurement ($T_1$) based on receipt of the calibration signal from each of the antennas via the coupling network. The apparatus further includes at least one processor configured to perform a joint Tx/Rx (TRx) calibration based on HR, $R_1$, and $T_1$.

In another embodiment, a method for a calibration and array operation in a multi-input multi-output (MIMO) system is provided. The method comprises generating an uplink channel measurement (HR) based on one or more uplink signals received via an antenna array comprising a plurality of antennas, sending a calibration signal via a coupling network for transmission by each of the antennas in the antenna array, generating an Rx calibration measurement ($R_1$) based on the one or more uplink signals received via both the antenna array and the coupling network, generating a Tx calibration measurement ($T_1$) based on receipt of the calibration signal from each of the antennas via the coupling network, and perform a joint Tx/Rx (TRx) calibration based on HR, $R_1$, and $T_1$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), disclosure can be extended to other OFDM-based transmission waveforms or multiple access schemes such as filtered OFDM (F-OFDM).

This present disclosure covers several components which can be used in conjunction or in combination with one another, or can operate as standalone schemes.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FOAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
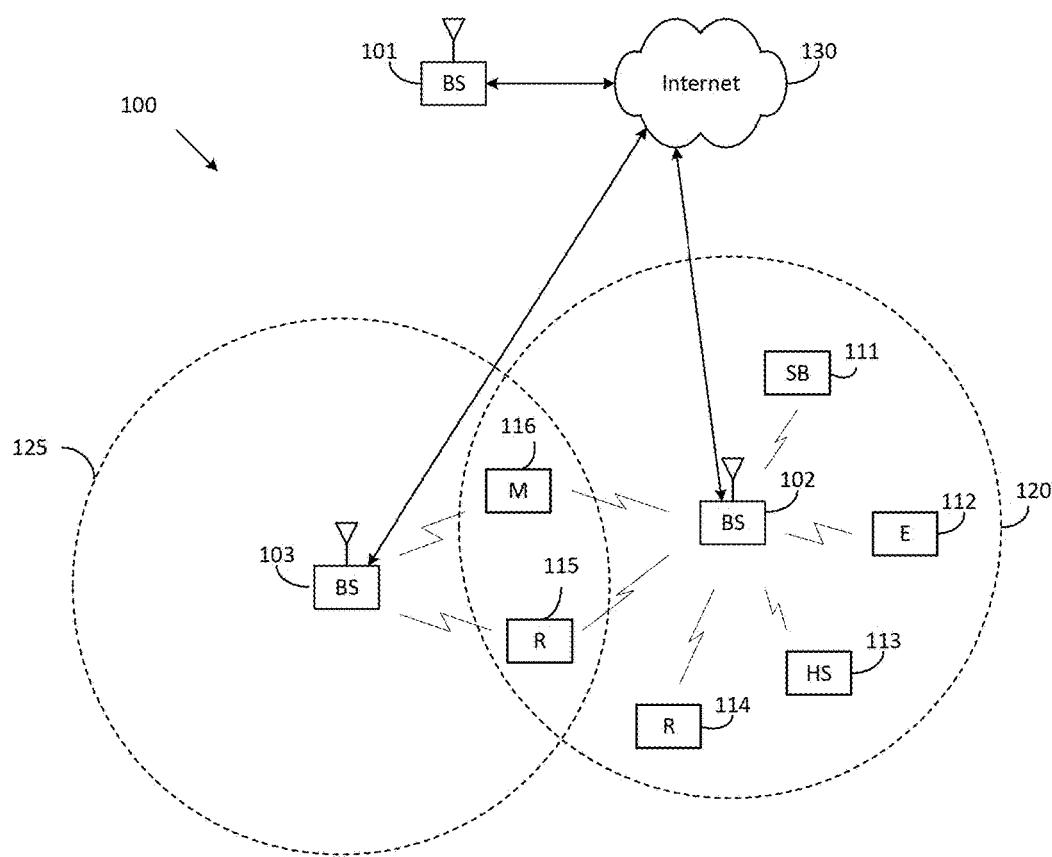
FIG. 1 illustrates an example wireless network according to embodiments of the present disclosure.
Figure 2:
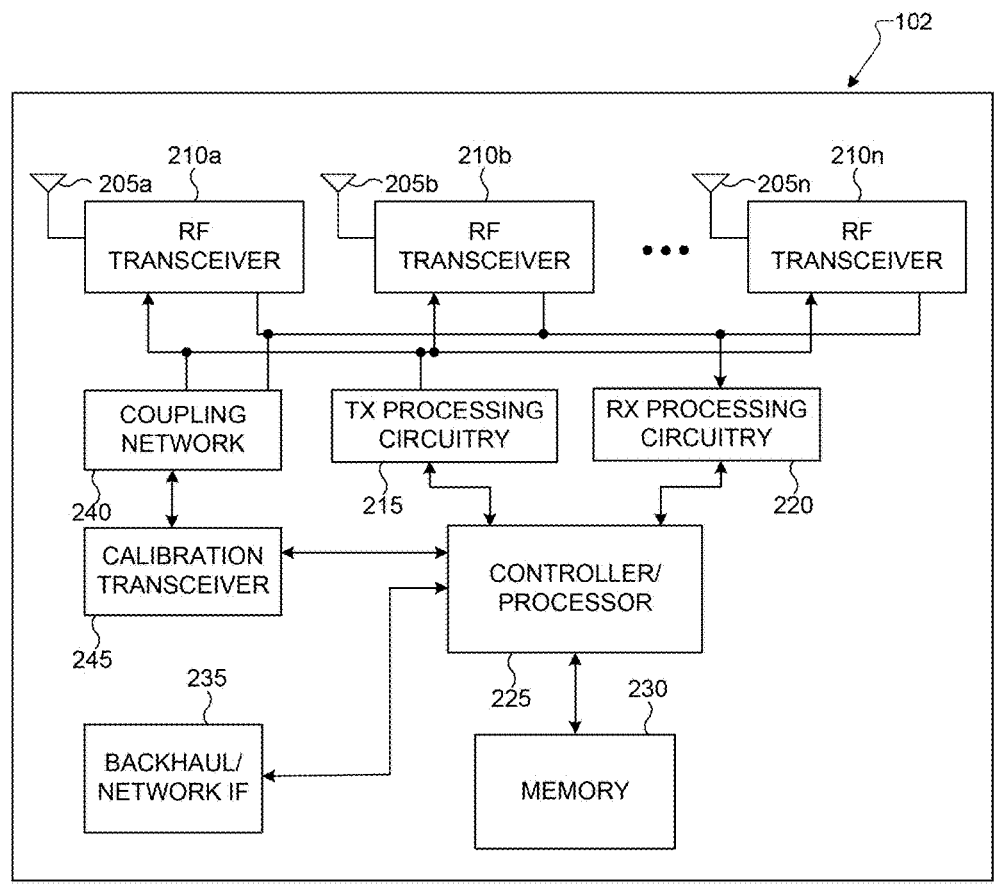
FIG. 2 illustrates an example eNodeB (eNB) according to embodiments of the present disclosure.
Figure 3:
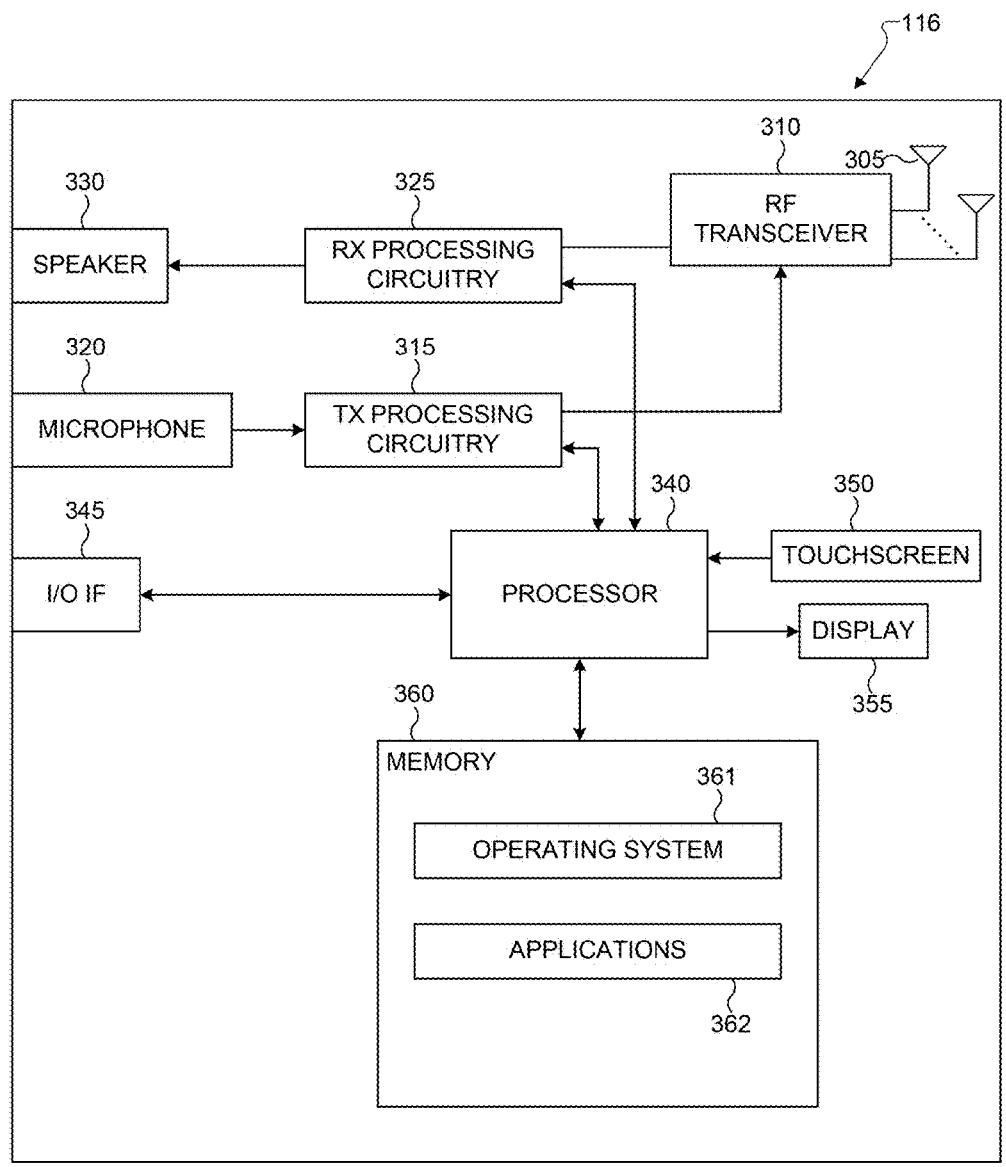
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), high speed packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient calibration and array operation in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n (e.g., antenna array), multiple RF transceivers 210a-210n, transmit (TX) processing circuitry 215, and receive (RX) processing circuitry 220. The eNB 102 also includes a controller/processor 225, a memory 230, and a backhaul or network interface 235. The eNB also includes a coupling network 240 and a calibration transceiver 2455.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/ processor 225. In some embodiments, the controller/processor 225 includes at least one microprocessor or microcontroller. As described in more detail below, the eNB 102 may include circuitry, programing, or a combination thereof. For example, controller/processor 225 can be configured to execute one or more instructions, stored in memory 230, that are configured to cause the controller/processor to process a calibration and array operation.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

In some embodiments, the eNB 102 could include an antenna array 205*a-n* comprising a plurality of antennas, transceiver processing circuitry to generate an uplink channel measurement (HR) based on uplink signals, and a coupling network 240. In some embodiments, the eNB 102 further includes a calibration system including calibration transceiver (e.g., calibration transmitter (Tx)) 245 to send a calibration signal via the coupling network and a calibration transceiver (e.g., calibration receiver (Rx)) 245 processing circuitry to generate an Rx calibration measurement ($R_1$). In some embodiments, the eNB 102 generates a Tx calibration measurement ($T_1$) based on the calibration signal and performs a joint Tx/Rx (TRx) calibration based on HR, $R_1$, and $T_1$.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
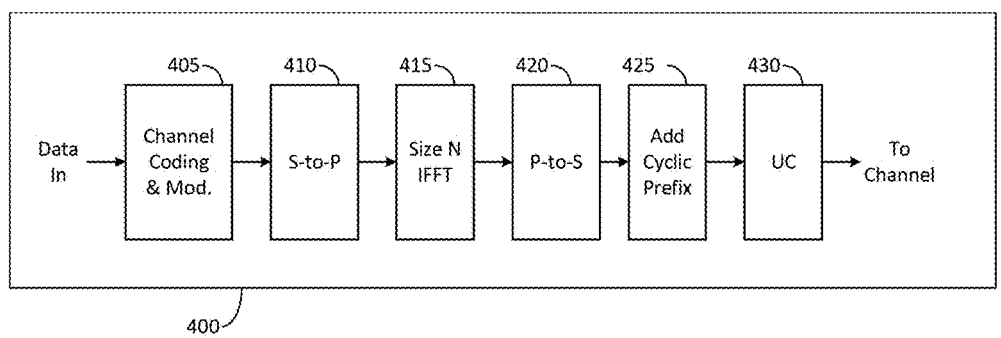
FIG. 4A illustrates a high-level diagram of an orthogonal frequency division multiple access transmit path according to embodiments of the present disclosure.
Figure 4B:
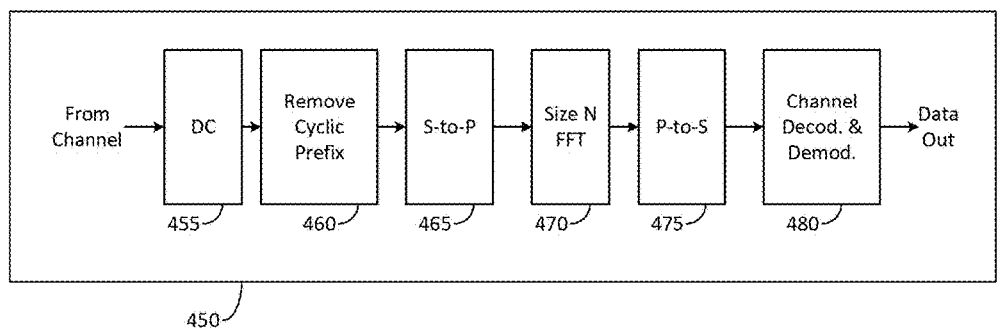
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the LTE specification precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
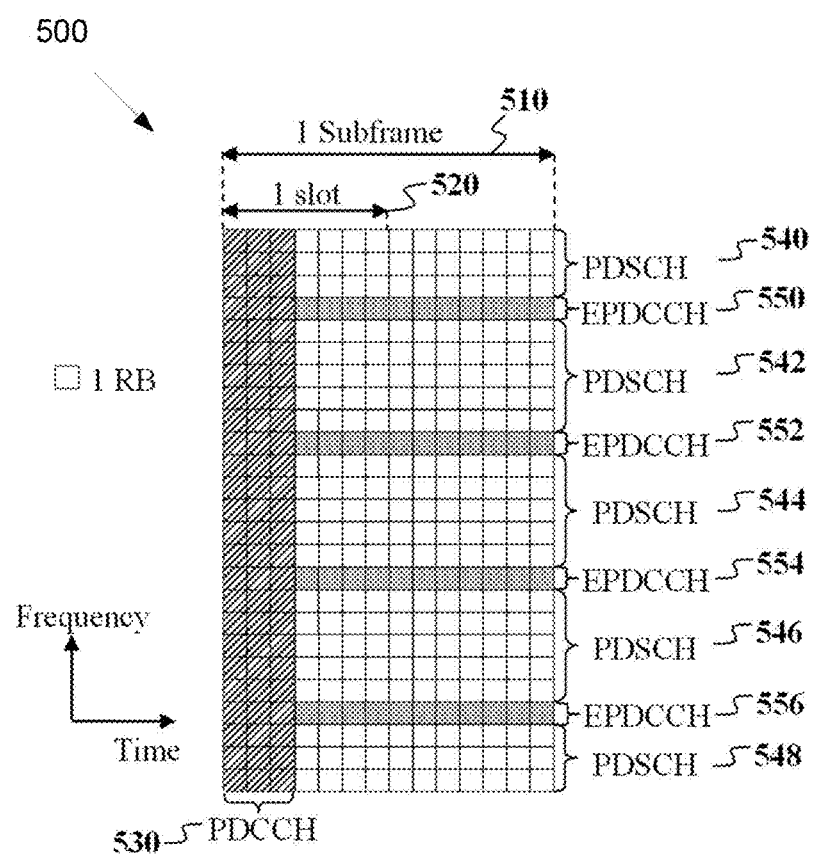
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCI}$ RBs for a total of $Z=O_F \lfloor (n_{s0}+y \cdot N_{EPDCCH})/D \rfloor$ REs for a PDSCH transmission BW. An EPDCCH transmission is achieved in either one RB or multiple of RBs.

In TDD systems, an eNB can obtain downlink CSI using uplink channel sounding if channel reciprocity holds. Since the circuitry components of the transceivers may differ due to manufacturing variations, loose tolerances, temperature and aging, the coherency between transceivers is lost. To ensure and restore coherency among all transceivers, a calibration scheme is needed. Otherwise, the estimated downlink CSI based on UL SRS is not aligned with actual downlink channels. In an FD-MIMO system, the calibration circuits need to interconnect a large number of antennas, which makes it difficult to manufacture these interconnections with uniform high precision. Calibration circuits with insufficient phase accuracy may result in large residual errors and degraded beam steering performance. Furthermore, the calibration accuracy may vary across antennas, thus results in inconsistent beamforming performance among antennas.

The present disclosure addresses these challenges by introducing robust calibration methods for precoding and virtualization, precoding methods accounted for calibration accuracy and RF hardware performance. In some embodiments, number of antennas is set to be 32 for illustration purpose. Embodiments apply to any number of antennas.

Figure 6:
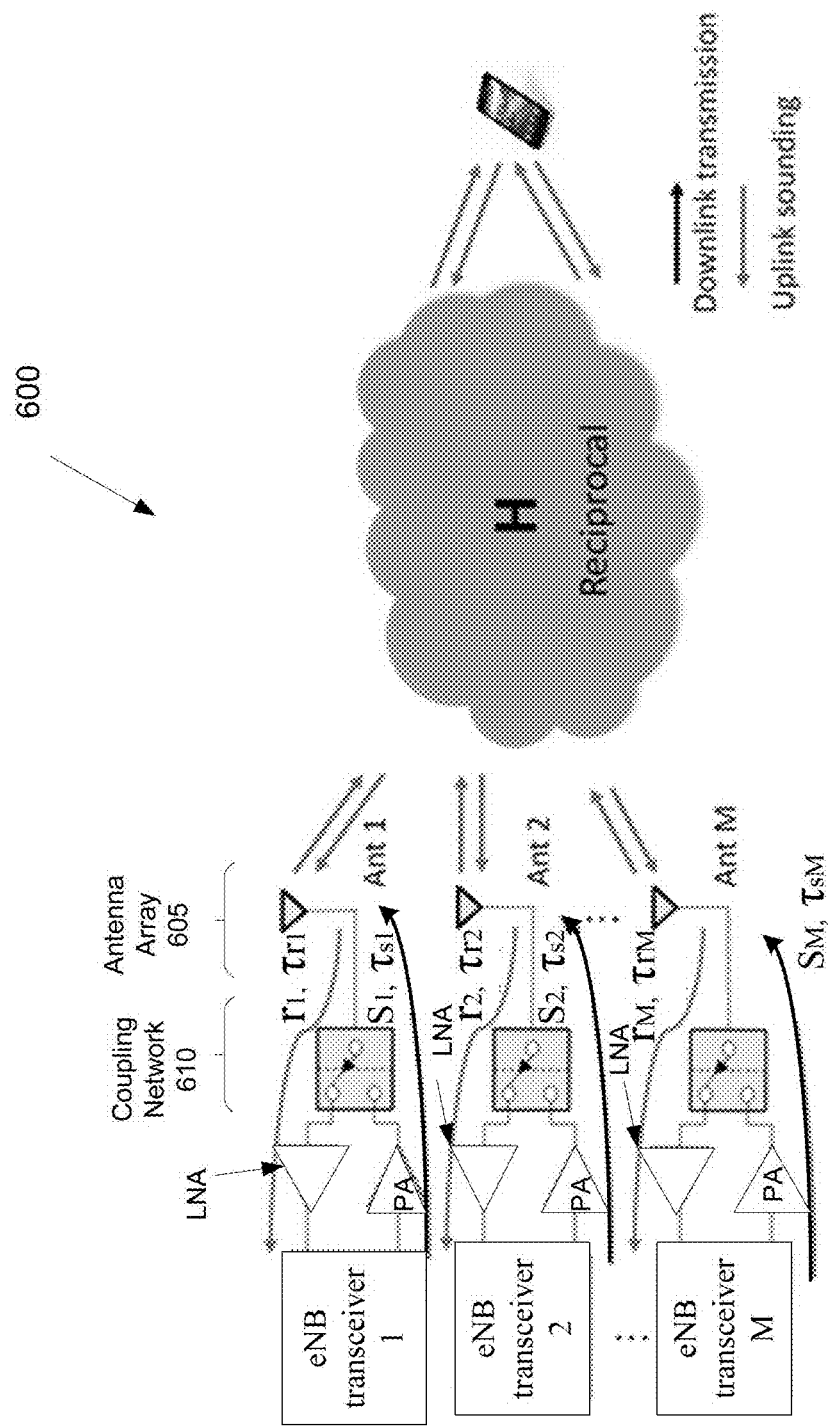
FIG. 6 illustrates an example channel mismatch in time division duplexing (TDD) system according to embodiments of the present disclosure.

FIG. 6 illustrates an example channel mismatch 600 in time division duplexing (TDD) system according to embodiments of the present disclosure. An embodiment of the channel mismatch 600 in the TDD system shown in FIG. 6 is for illustration only. Other embodiments may be used without departing from the scope of the present disclosure. As shown in FIG. 6, the channel mismatch 600 in TDD system comprises an antenna array 605 and coupling network 610.

Tx and Rx branches have different RF characteristics due to manufacture imperfection, filter mismatches, etc. A signal sent/received from different branches may have a different response. The responses can be represented by a linear time invariant system. There is no multipath for each branch, and only a single tap delay is introduced by the filtering, different wire length, etc. Therefore, the parameters to be measured and calibrated are determined: $r_i$ (complex Rx gain); $g_{ri}$ ($g_{ri}$=abs($r_i$)); $\phi_{ri}$ ($\phi_{ri}$=angle($r_i$)); $s_i$ (complex Tx gain); $g_{si}$ ($g_{si}$=abs($s_i$)); $\phi_{si}$ ($\phi_{si}$=angle($s_i$)); $\tau_{ri}$ (Rx group delay (fractional samples)); and $\tau_{si}$ (Tx group delay (fractional samples)).

In some embodiments of the first step of Rx calibration, a common transmitter sends a known sequence u[n] to all Rxs. After DAC, the analog output is u(t), where $u(nT_s)=u[n]$ at sampling timing, where $T_s$ is the DAC sampling rate (here assumed to be at baseband). Then, u(t) is up-converted into RF signal at the output of the common transmitter: $s_0 u(t) \exp(j2\pi f_c t)$, where $s_0$ represents the initial phase introduced by the LO, and gain and phase introduced by the common transmitter. Each path has a different delay, and for Rx i the group delay is $\tau_{ri}$. Such group delay is mainly introduced by the analog filters. For each path, the phase introduced by the coupling network is also different and such difference is caused by the mismatch of branches of the coupling network to different transceivers. Denote $\phi_{ci}$ the phase from the common output point of common transmitter to the coupler at receiver antenna i. The RF signal at Rx i is: $y_{RF,i}(t)=r_i s_0 u(t-\tau_{ri}) \exp(j2\pi f_c(t-\tau_{ri})+j\phi_{ci})+n_i(t)$ where $r_i$ captures the complex gain from coupler of the receiver i to the ADC and $n_i(t)$ is additive noise. After down-converting, anti-aliasing low-pass filtering and ADC:

$$y_i[n] = r_i s_0 u\left[n - \frac{\tau_{ri}}{T_s}\right] \exp(j(\phi_{ci} - 2\pi f_c \tau_{ri})) + n_i[n]$$

where $u[n-\tau_{ri}/T_s]$ shall be interpreted as a fractional sample delay. Note that the phase of LO in the down-converter at the receiver i is included in $r_i$.

In some embodiments of the second step of Rx calibration, after capturing, the signal is converted into frequency domain. FFT window starts at $n_0$ samples, which is assumed to be larger than the maximum path delay (to avoid junk data at the beginning). Assuming the FFT size is N: FFT($y_i$)=FFT $(y_i[n_0], \ldots, y_i[N+n_0-1])$. Note that $r_i s_0 \exp(j\phi_{ci}-2\pi f_c \tau_{ri})$ is a constant independent of n. So, the frequency domain signal at subcarrier k is:

$$x_{ik} = r_i s_0 U[k] \exp\left(j\left(2\pi \frac{\left(n_0 - \frac{\tau_{ri}}{T_s}\right)k}{N} + \phi_{ci} - 2\pi f_c \tau_{ri}\right)\right) + n_{ik},$$

$$x_{ik} = g_{ri} g_{s0} U[k] \exp\left(j\left(2\pi \frac{\left(n_0 - \frac{\tau_{ri}}{T_s}\right)k}{N} + \phi_{ci} + \phi_{ri} + \theta_{s0} - 2\pi f_c \tau_{ri}\right)\right) + n_{ik}$$

where U[k] is the DFT of [u[0], . . . , u[N−1]], e.g., the frequency response at subcarrier k. Note that in the above equation the common group delay introduced by FFT windowing is $$\frac{2\pi k n_0}{N}.$$

In some embodiments, U[k] is one SRS sequence.

In some embodiments of the third step of Rx calibration, equalization (remove SRS) is performed. After removal of U[k], $$x'_{ir} =$$

$$\frac{x_{ik}}{U[k]} = g_{ri} g_{s0} \exp\left(j\left(-2\pi \frac{k\tau_{ri}}{NT_s} + 2\pi \frac{k n_0}{N} + \phi_{ri} + \theta_{s0} + \phi_{ci} - 2\pi f_c \tau_{ri}\right)\right) + n_{ik}.$$

In some embodiments of the fourth step of Rx calibration, calibration is performed. In such embodiments, calibrate antenna i=2 to N w.r.t. antenna 1. The correction factor at subcarrier k (or RB k, as only 1 subcarrier is selected per RB) is $$C_{ik}^r = \frac{x'_{1r}}{x'_{ir}} \approx$$

$$\frac{g_{r1}}{g_{ri}}\exp\left(j\left(-2\pi\frac{k(\tau_{r1} - \tau_{ri})}{NT_s} + \phi_{r1} - \phi_{ri} + \phi_{c1} - \phi_{ci} - 2\pi f_c\tau_{r1} + 2\pi f_c\tau_{ri}\right)\right).$$

In such embodiments, Rx correction matrix for frequency k is $C_{rk}$=drag (1, $C_{2k}^r$, ..., $C_{32k}^r$)=$C_{rk}^a \cdot \Delta_1^c$ where $C_{rk}^a$ is a diagonal matrix with the ith diagonal element as $$\frac{g_{r1}}{g_{ri}}\exp(j\left(-2\pi\frac{k(\tau_{r1} - \tau_{ri})}{NT_s} + \phi_{r1} - \phi_{ri} - 2\pi f_c\tau_{r1} + 2\pi f_c\tau_{ri}\right)$$

and $\Delta_1^c$ is a diagonal matrix with the ith diagonal element as $\exp(j(\phi_{c1}-\phi_{ci}))$.

In some embodiments of step 1 for signal capture, each of the transmitters sends a known sequence u[n] to a common Rx. After DAC, the analog output is u(t). Then, RF signal before the common point of the common receiver is $s_iu(t-\tau_{si})$ exp(j2πf$_c$(t−τ$_{si}$)), where $s_i$ is a complex gain including initial phase introduced by the LO and other RF characteristics in transmitter i, $\tau_{si}$ is the delay introduced by the transmitter i. All the Txs start transmission at the same time stamp (e.g., the beginning of an OFDM symbol). The captured signal at the common Rx is: $y_{RF,i}(t)=s_ir_ou(t-\tau_{si})$ exp(j2πf$_c$(t−τ$_{si}$)+φ$_{ci}$)+n$_i$(t) where $r_o$ captures the complex response at the common receiver. After down-converting, anti-aliasing low-pass filtering and ADC: $y_i[n]=s_ir_ou[n-\tau_{si}/T_s]\exp(-j2\pi f_c\tau_{si}+\phi_{ci})+n_i[n]$. Note that the phase of LO in the down-converter at the common receiver is included in $r_0$.

In some embodiments of step 2 in frequency domain, after captures, the signal is converted into frequency domain. FFT window starts at $n_0$ samples, which is assumed to be larger than the maximum path delay (to avoid junk data at the beginning). Assuming the FFT size is N: FFT($y_i$)=FFT(($y_i$ [$n_0$], ..., $y_i$[N+$n_0$−1])). So, the frequency domain signal at subcarrier k is:

$$x_{ik} = r_0s_iU[k]\exp\left(j\left(2\pi\frac{\left(n_0 - \frac{\tau_{si}}{T_s}\right)k}{N} + \phi_{ci} - 2\pi f_c\tau_{si}\right)\right) + n_{ik},$$

$$x_{ik} = g_{si}g_{r0}U[k]\exp\left(j\left(2\pi\frac{\left(n_0 - \frac{\tau_{si}}{T_s}\right)k}{N} + \phi_{ci} + \phi_{si} + \theta_{s0} - 2\pi f_c\tau_{si}\right)\right) + n_{ik}$$

In some embodiments of step 3 for equalization (remove SRS). After removal of $[k]x'_{is} =$ $$\frac{x_{ik}}{U[k]} = g_{si}g_{r0}\exp\left(j\left(2\pi\frac{\left(n_0 - \frac{\tau_{si}}{T_s}\right)k}{N} + \phi_{ci} + \phi_{si} + \theta_{s0} - 2\pi f_c\tau_{si}\right)\right) + n_{ik}.$$

In some embodiments of step 4 for calibration, calibrate antenna i=2 to N w.r.t. antenna 1. The correction factor at subcarrier k (or RB k, as only 1 subcarrier is selected per RB) is:

$$C_{ik}^s = \frac{x'_{1s}}{x'_{is}} \approx$$

$$\frac{g_{s1}}{g_{s0}}\exp\left(j\left(-2\pi\frac{k(\tau_{s1} - \tau_{si})}{NT_s} + \phi_{s1} - \phi_{si} + \phi_{c1} - \phi_{ci} - 2\pi f_c\tau_{s1} + 2\pi f_c\tau_{si}\right)\right).$$

Then, Tx correction matrix for frequency k is: $C_{sk}$=diag (1, $C_{2k}^s$, ..., $C_{32k}^s$)=$C_{sk}^a \cdot \Delta_1^c$ where $C_{sk}^a$ is a diagonal matrix with the ith diagonal element as $$\frac{g_{s1}}{g_{s0}}\exp(j\left(-2\pi\frac{k(\tau_{s1} - \tau_{si})}{NT_s} + \phi_{s1} - \phi_{si} - 2\pi f_c\tau_{s1} + 2\pi f_c\tau_{si}\right).$$

If the coupling network is well matched, $\Delta_{ji}=\phi_{cj}-\phi_{ci}\approx 0$ for all i and j. For example, the maximum absolute value of $\Delta_{ji}$ may be smaller than 5°, where $\vec{h}_{kp}$: uplink SRS channel estimate at RB k and UE p, apply Rx compensation: $\vec{h}'_{kp} = C_{rk}\vec{h}_{kp}$, calculate precoder $P_k$ (e.g., CB or SLNR) based on $\vec{h}'_{kp}$, and apply Tx compensation: $P'_k=C_{sk}P_k$. For open loop precoding, no Rx compensation is performed; only Tx compensation is needed.

In the mode of Tx/Rx joint calibration, a joint correction factor is used for a transceiver pair. For transceiver i and frequency k, $$C_{ik} = \frac{c_{ik}^r}{c_{ik}^s}$$

and the joint correction matrix for frequency k is $$C_k = \text{diag}(1, C_{2k}, \ldots, C_{32k}) = \frac{c_{rk}}{c_{sk}} = \frac{c_{rk}^a}{c_{sk}^a},$$

where $\vec{h}_{kp}$: uplink SRS channel estimate at RB k and UE p, apply joint compensation: $\vec{h}'_{kp} = C_k\vec{h}_{kp}$, calculate precoder $P_k$ (e.g., CB or SLNR) based on $\vec{h}'_{kp}$, and joint compensation cannot be applied to open loop beamforming.

In some embodiments, gain and phase mismatch in coupling network and antenna occur because the distance between the point of coupling for different antenna elements and common measurement point cannot be perfectly matched. In some embodiments, phase mismatch among branches of coupling network may be occurred.

Figure 7:
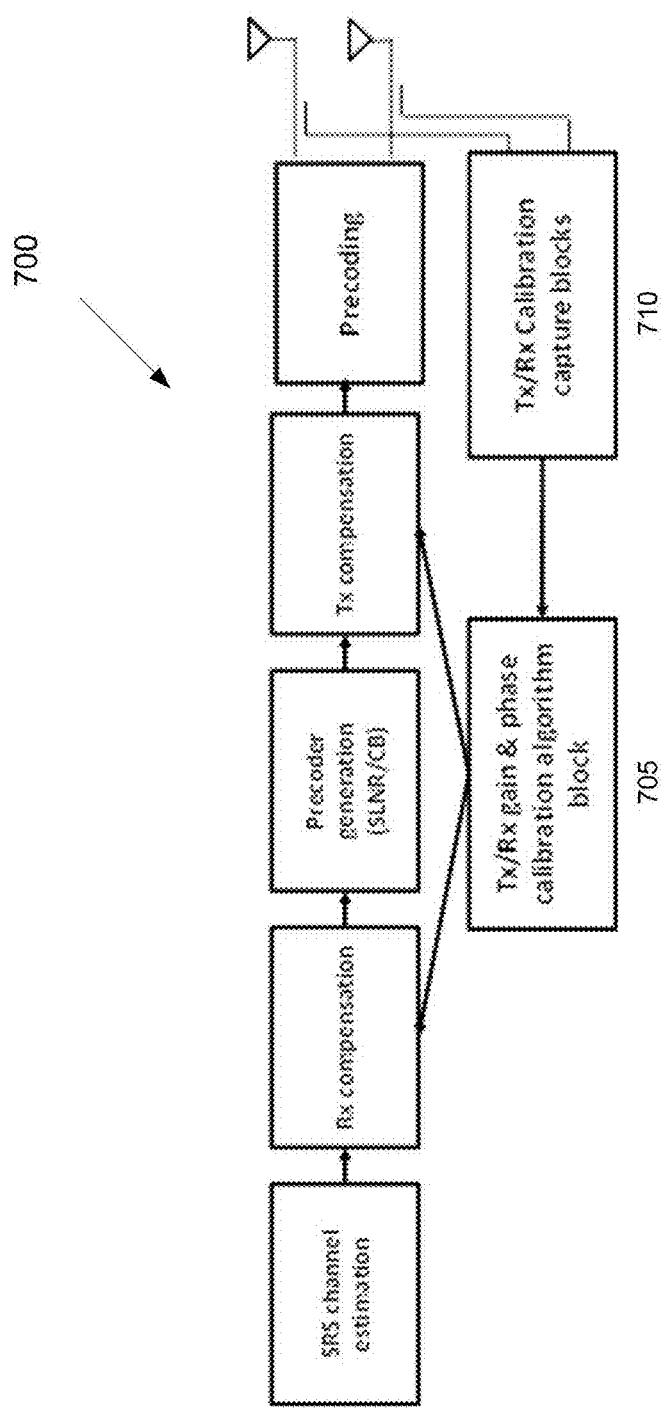
FIG. 7 illustrates an example separate transmit/receive (Tx/Rx) calibration according to embodiments of the present disclosure.

FIG. 7 illustrates an example separate transmit/receive (Tx/Rx) calibration 700 according to embodiments of the present disclosure. An embodiment of the Tx/Rx calibration 700 shown in FIG. 7 is for illustration only. Other embodiments may be used without departing from the scope of the present disclosure. As shown in FIG. 7 the Tx/Rx calibration 700 comprises a Tx/Rx gain & phase calibration algorithm block 705 and a Tx/Rx calibration capture blocks 710. Specifically, the Tx/Rx gain & phase calibration algorithm block 705 connects with an Rx compression and Tx compression.

Joint compensation is equivalent to separate compensation with perfectly matched coupling network in advanced precoding algorithms such as signal to leakage and noise ratio (SLNR) algorithm, given gain is aligned (even) among all Tx and Rx channels. At frequency k, assume the channel matrix after SRS channel estimation: $H_{df}=H_{L\times M}$ diag ($r_1$ exp($-j2\pi\Delta k\tau_{r1}$), ..., $r_M$ exp($-j2\pi\Delta k\tau_{rM}$))=$HR_k$ where L is the number of UEs, and $\Delta$ is subcarrier spacing ($\Delta=1/T_sN$). Ideally, the SLNR precoding is $P=\alpha H^H(\sigma^2I+HH^H)^{-1}$ where $\alpha$ can be any scalar while the precoding is equivalent and $\sigma^2$ is a scaling factor.

For separate Tx/Rx calibration and compensation with perfectly matched calibration network: the channel after Rx compensation is $H'=H_{df}C_{rk}=r_1\exp(j\phi_{com})H$ where H is the actual channel and $\phi_{com}$ is a common phase; precoding of SLNR is in the form of (the constant complex number $r_1$ does not affect the precoding and can be absorbed by $\sigma^2$): $P_{1k}=H'^H(\sigma^2I+H'H'^H)^{-1}$; Tx compensation is: $P'_{1k}=C_{sk}P_{1k}$; and over the air signal is: $s_k$=diag($s_1$ exp($-j2\pi\Delta k\tau_{r1}$), ..., $s_M$ exp($-j2\pi\Delta k\tau_{rM}$))$P'_1 x$=Px.

For separate Tx/Rx calibration and compensation with any coupling network: to channel after Rx compensation is $H'=H_{df}C_{rk}=r_1 H\Delta_1^c$ where H is the actual channel; precoding of SLNR is in the form of (the constant complex number $r_1$ does not affect the precoding and can be absorbed by $\sigma^2$): $P_{1k}=\Delta_1^{cH}H^H(\sigma^2I+H\Delta_1^c\Delta_1^{cH}H^H)^{-1}=\Delta_1^{cH}H^H(\sigma^2I+HH^H)^{-1}$; Tx compensation is: $P'_{1k}=C_{sk}P_{1k}=C_{sk}^a\cdot\Delta_1^c\Delta_1^{cH}H^H(\sigma^2I+H\Delta_1^c\Delta_1^{cH}H^H)^{-1}$, $P'_{1k}=C_{sk}^a\cdot H^H(\sigma^2I+H\Delta_1^c\Delta_1^{cH}H^H)^{-1}$; and over the air signal is: $s_k$=diag($s_1$ exp ($-j2\pi\Delta k\tau_{r1}$), ..., $s_M$ exp($-j2\pi\Delta k\tau_{rM}$))$P'_1 x$=Px.

For joint Tx/Rx calibration and compensation with any coupling network and perfect gain alignment: the channel after Rx compensation is $H'=H_{df}C_k=r_1H(C_{sk}^a)^{-1}$ where H is the actual channel; precoding of SLNR is in the form of: $P_{2k}=C_{ck}^{-aH}H^H(\sigma^2I+HC_{sk}^{-a}C_{sk}^{-aH}H^H)^{-1}$, $P_{2k}=C_{sk}^{-aH}H^H(\sigma^2I+HH^H)^{-1}$; and over the air signal is: $s_k$=diag($s_1$ exp($-2\pi\Delta k\tau_{s1}$), ..., $s_M$ exp($-j2\pi\Delta k\tau_{sM}$))$P_{2k}x$=Px.

For simplicity, derivation in the aforementioned embodiment is based on single antenna UEs, nevertheless, extensions to multi-antenna UEs can be made via the same principles. The received signal at UE p is: $y_{kp}=\sqrt{G_{kp}}h_{kp}^H w_{kp}s_{kp}+\sqrt{G_{kp}}h_{kp}^H\Sigma_{i\neq p}w_{ki}s_{ki}+n_{kp}$, p=1, ..., L where $h_{kp}$ is normalized channel for UE p at frequency k. Denote $\sigma_{kp}^2$ the variance of $n_{kp}$, i.e., receive noise power at UE p, the signal model used for SLNR precoding is $$y'_{kp}=\frac{y_{kp}}{\sigma_{kp}}=\sqrt{\frac{G_{kp}}{\sigma_{kp}^2}}h_{kp}^H w_{kp}s_{kp}+\sqrt{\frac{G_{kp}}{\sigma_{kp}^2}}h_{kp}^H\Sigma_{i\neq p}w_{ki}s_{ki}+n'_{pk}.$$

Denote the gain matrix $G_k$:

$$G_k=\text{diag}\left(\sqrt{\frac{G_{k1}}{\sigma_{k1}^2}},\ldots,\sqrt{\frac{G_{kL}}{\sigma_{kL}^2}}\right).$$

Then, the SLNR precoder for UE p is: $w_{kp}:=\alpha_p\times$ the kth column of $(\overline{H}_k(G_k^{-1}+\overline{H}_k^H\overline{H}_k)^{-1})$. If there is gain mismatch in calibration, then $\hat{G}_k=G_k+\Delta G_k$.

In some embodiments of a two-step joint Tx/Rx calibration is devised to resolve challenges of: gain mismatch among different branches of the coupling network, and actual antenna gain in transmission or reception; and phase mismatch among different branches of coupling network.

Tx and Rx gains are compensated not using the coupling network, instead they are measured and compensated via offline measurements or external antennas. Denote measured the Tx and Rx gains as $G_{s,i}$ and $G_{r,i}$, where i=1, ..., M.

Figure 8:
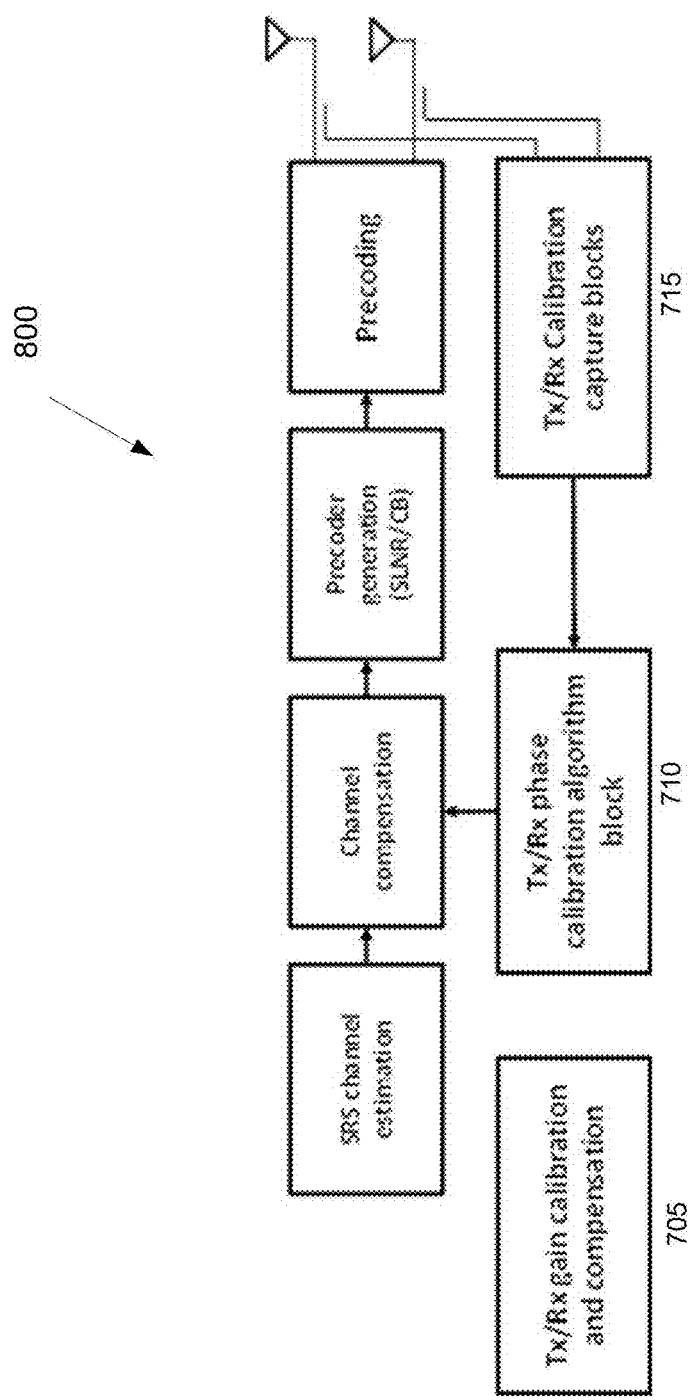
FIG. 8 illustrates an example two-step joint Tx/Rx calibration according to embodiments of the present disclosure.

FIG. 8 illustrates an example two-step joint Tx/Rx calibration 800 according to embodiments of the present disclosure. An embodiment of the two-step joint Tx/Rx calibration 800 shown in FIG. 8 is for illustration only. Other embodiments may be used without departing from the scope of the present disclosure. As shown in FIG. 8, the two-step joint Tx/Rx calibration 800 comprises a Tx/Rx gain calibration and compensation 705, Tx/Rx phase calibration algorithm block 710, and Tx/Rx calibration capture blocks 715.

In some embodiments of step 1 signal capture, after down-converting, anti-aliasing low-pass filtering and ADC: $y_i[n]=r_is_0u[n-\tau_{ri}/T_s]\exp(j(\phi_{ci}-2\pi f_c\tau_{ri}))+n_i[n]$ where $u[n-\tau_{ri}/T_s]$ shall be interpreted as a fractional sample delay.

In some embodiments of step 2 frequency domain processing, after captures, the signal is converted into frequency domain. FFT window starts at $n_0$ samples, which is assumed to be larger than the maximum path delay (to avoid junk data at the beginning). Assuming the FFT size is N: FFT($y_i$)=FFT ($y_i[n_0],\ldots,y_i[Nib+n_0-1]$).

Note that $r_is_0 \exp(j(\phi_{ci}-2\pi f_c\tau_{ri}))$ is a constant independent of n. So, the frequency domain signal at subcarrier k is:

$$x_{ik}=g_{ri}g_{s0}U[k]\exp\left(j\left(2\pi\frac{\left(n_0-\frac{\tau_{ri}}{T_s}\right)k}{N}+\phi_{ci}+\phi_{ri}+\theta_{s0}-2\pi f_c\tau_{ri}\right)\right)+$$

$n_{ik}$ where $U[k]$ is the DFT of $[u[0],\ldots,u[N-1]]$, e.g., the frequency response at subcarrier k.

In some embodiments of step 3 equalization (remove SRS). After removal of $$x'_{ir}=\frac{x_{ik}}{U[k]}=g_{ri}g_{s0}\exp\left(j\left(-2\pi\frac{k\tau_{ri}}{NT_s}+2\pi\frac{kn_0}{N}+\phi_{ri}+\theta_{s0}+\phi_{ci}-2\pi f_c\tau_{ri}\right)\right)+n_{ik}.$$

In some embodiments of step 4 find phase for each antenna at frequency k.

$$r_{ki}=\exp(\text{angle}(x'_{ir}))\approx\exp\left(j\left(-2\pi\frac{k\tau_{ri}}{NT_s}+2\pi\frac{kn_0}{N}+\phi_{ri}+\theta_{s0}+\phi_{ci}-2\pi f_c\tau_{ri}\right)\right)$$

where i=1, ..., M.

In some embodiments of step 5 calibration, calibrate antenna i=2 to N w.r.t. antenna 1. The correction factor at subcarrier k (or RB k, as only 1 subcarrier is selected per RB) is:

$$c_{ik}^r=\frac{r_{k1}}{r_{ki}}=\exp\left(j\left(-2\pi\frac{k(\tau_{r1}-\tau_{ri})}{NT_s}+\phi_{r1}-\phi_{ri}-\phi_{c1}-\phi_{ci}-2\pi f_c\tau_{r1}+2\pi f_c\tau_{ri}\right)\right).$$

Then, Rx correction matrix for frequency k is: $C_{rk}$=diag (1, $C_{2k}^r$, ..., $C_{32k}^r$)=$C_{rk}^a\cdot\Delta_1^c$ where $C_{rk}^a$ is a diagonal matrix with the ith diagonal element as $$\exp\left(j\left(-2\pi\frac{k(\tau_{r1}-\tau_{ri})}{NT_s}+\phi_{r1}-\phi_{ri}-2\pi f_c\tau_{r1}+2\pi f_c\tau_{ri}\right)\right)$$

and $\Delta_1^c$ is a diagonal matrix with the ith diagonal element as $\exp(j(\phi_{c1}-\phi_{ci}))$.

In some embodiments of step 1 Signal capture, the captured signal at the common Rx is: $y_{RF,i}(t)=s_i r_o u(t-\tau_{si})\exp(j2\pi f_c(t-\tau_{si})+\phi_{ci})+n_i(t)$ where $r_o$ captures the complex response at the common receiver. After down-converting, anti-aliasing low-pass filtering and ADC: $y_i[n]=s_i r_o u[n-\tau_{si}/T_s]\exp(j2\pi f_c\tau_{si}+\phi_{ci})+n_i[n]$.

In some embodiments of step 2 frequency domain processing, after captures, the signal is converted into frequency domain. FFT window starts at $n_0$ samples, which is assumed to be larger than the maximum path delay (to avoid junk data at the beginning). Assuming the FFT size is N: $FFT(y_i)=FFT((y_i[n_0], \ldots, y_i[N+n_0-1]))$. So, the frequency domain signal at subcarrier k is:

$$x_{ik}=g_{si}g_{r0}U[k]\exp\left(j\left(2\pi\frac{\left(n_0-\frac{\tau_{si}}{T_s}\right)k}{N}+\phi_{ci}+\phi_{si}+\theta_{s0}-2\pi f_c\tau_{si}\right)\right)+n_{ik}.$$

In some embodiments of step 3 equalization (remove SRS). After removal of $$U[k]x'_{is}=\frac{x_{ik}}{U[k]}=$$
$$g_{si}g_{r0}\exp\left(j\left(2\pi\frac{\left(n_0-\frac{\tau_{si}}{T_s}\right)k}{N}+\phi_{ci}+\phi_{si}+\theta_{s0}-2\pi f_c\tau_{si}\right)\right)+n_{ik}.$$

In some embodiments of step 4 find phase for each antenna at frequency k, $$s_{ki}=$$
$$\exp(\text{angle}$$
$$(x'_{is}))\approx\exp\left(j\left(-2\pi\frac{k\tau_{si}}{NT_s}+2\pi\frac{kn_0}{N}+\phi_{si}+\theta_{r0}+\phi_{ci}-2\pi f_c\tau_{si}\right)\right)$$

where $i=1, \ldots, M$.

In some embodiments of step 5 calibration, calibrate antenna $i=2$ to N w.r.t. antenna 1. The correction factor at subcarrier k (or RB k, as only 1 subcarrier is selected per RB) is:

$$C_{ik}^s=$$
$$\frac{s_{k1}}{s_{ki}}\approx\exp\left(j\left(-2\pi\frac{k(\tau_{s1}-\tau_{si})}{NT_s}+\phi_{s1}-\phi_{si}+\phi_{c1}-\phi_{ci}-2\pi f_c\tau_{s1}+2\pi f_c\tau_{si}\right)\right).$$

Then, Tx correction matrix for frequency k is: $C_{sk}=\text{diag}(1, C_{2k}^s, \ldots, C_{32k}^s)=C_{sk}^a\cdot\Delta_1^c$ where $C_{sk}^a$ is a diagonal matrix with the ith diagonal element as $$\exp\left(j\left(-2\pi\frac{k(\tau_{s1}-\tau_{si})}{NT_s}+\phi_{s1}-\phi_{si}-2\pi f_c\tau_{s1}+2\pi f_c\tau_{si}\right)\right).$$

A joint correction factor is used for a transceiver pair. For transceiver i and frequency k, $$C_{ik}=\frac{c_{ik}^r}{c_{ik}^s}$$

and the joint correction matrix for frequency k is $$C_k=\text{diag}(1, C_{2k}, \ldots, C_{32k})=\frac{c_{rk}}{c_{sk}}=\frac{c_{rk}^a}{c_{sk}^a}.$$

The normalized channel for UE p at frequency k is $h_{kp}$. Then, apply joint compensation: $h_{kp}^c=C_k h_{kp}$. Calculate precoder $P_k$ (e.g., CB or SLNR) based on $h_{kp}^c$. Note that because $C_k$ only contains phase correction and all the elements have unit absolute value, $h_{kp}^c$ still have unit norm.

At frequency k, the channel matrix after SRS channel estimation is: $H_{dl}=H_{L\times M}\text{diag}(r_1\exp(-j2\pi\Delta k\tau_{r1}), \ldots, r_M\exp(-j2\pi\Delta k\tau_{rM}))=H_{L\times M}R$ where L is the number of UEs. The above equation can be also written as: $H_{dl}=\overline{H}_k\text{diag}(r_1, \ldots, r_M)\text{diag}(\exp(j(\phi_{r1}-2\pi\Delta k\tau_{r1})), \ldots, \exp(j(\phi_{r1}-2\pi\Delta k\tau_{rM})))$.

Define the Rx antenna gain matrix as $G_{rk}=\text{diag}(g_{r1}, \ldots, g_{rM})$ The received channel after normalization is $G_k^{-1}H_{dl}=\overline{H}_k G_{rk}\text{diag}(\exp(j(\phi_{r1}-2\pi\Delta k\tau_{r1})), \ldots, \exp(j(\phi_{r1}-2\pi\Delta k\tau_{rM})))$.

After the joint phase compensation being applied, the normalized channel is $\overline{H}_k'=\overline{H}_k G_{rk}\text{diag}(\exp(j(\phi_{r1}-2\pi\Delta k\tau_{r1})), \ldots, \exp(j(\phi_{rM}-2\pi\Delta k\tau_{rM})))=\exp(j\phi_{com,1})\overline{H}_k G_{rk}\text{diag}(1, \ldots, \exp(j(2\pi\Delta k(\tau_{s1}-\tau_{sM})-\phi_{s1}+\phi_{sM})))$ where $\phi_{com,1}$ is a common phase among all antennas. The SLNR precoding is $P_k=\overline{H}_k'^H(G_k^{-1}+\overline{H}_k'\overline{H}_k'^H)^{-1}=\overline{H}_k'^H(G_k^{-1}+\overline{H}_k G_{rk}^2\overline{H}_k^H)^{-1}$ Over the air signal is: $s_k=\text{diag}(s_1\exp(-j2\pi\Delta k\tau_{s1}), \ldots, s_M\exp(-j2\pi\Delta k\tau_{sM}))P_k x=\exp(j\phi_{com,2})G_{sk}\overline{H}_k^H(G_k^{-1}+\overline{H}_k G_{rk}^2\overline{H}_k^H)^{-1}x$ where $\phi_{com,2}$ is a common phase among all antennas and $G_{sk}=\text{diag}(g_{s1}, \ldots, g_{sM})$. Note that Tx and Rx gains are calibrated separately, that is $G_{sk}=aI$ and $G_{rk}=bI$. So $$s_k=\frac{\exp(j\phi_{com,2})a}{b^2}\overline{H}_k^H((b^2G_k^c)^{-1}+\overline{H}_k\overline{H}_k^H)^{-1}x$$

Figure 9:
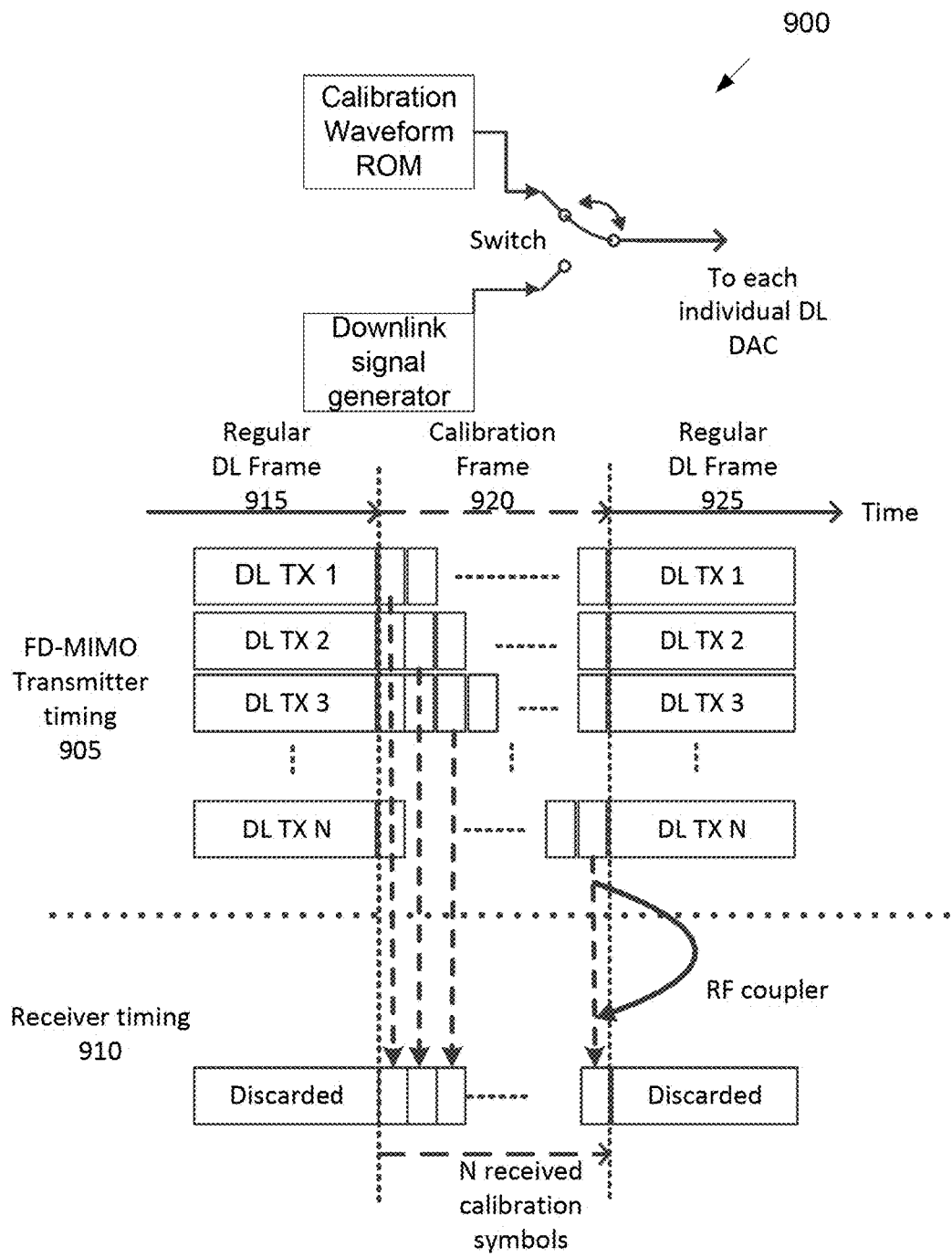
FIG. 9 illustrates an example Tx phase calibration according to embodiments of the present disclosure.

FIG. 9 illustrates an example Tx phase calibration 900 according to embodiments of the present disclosure. An embodiment of the Tx phase calibration 900 shown in FIG. 9 is for illustration only. Other embodiments may be used without departing from the scope of the present disclosure. As shown in FIG. 9, the Tx phase calibration 900 comprises a FD-MIMO transmitter timing 905 and a receiver timing 910. In each transmitter and receiver timing, a regular downlink frame 915 is converted to a calibration frame 920, and then the calibration frame 920 is converted into the regular downlink frame 925.

Tx calibration block diagram and procedure are illustrated for a 32 Tx antenna system as shown in FIG. 9. 32 Tx sends calibration signal sequentially in 32 OFDM symbols. Signals are captured by calibration Rx with precise timing. Captured signals are converted into frequency domain and fed to calibration algorithm block.

Figure 10:
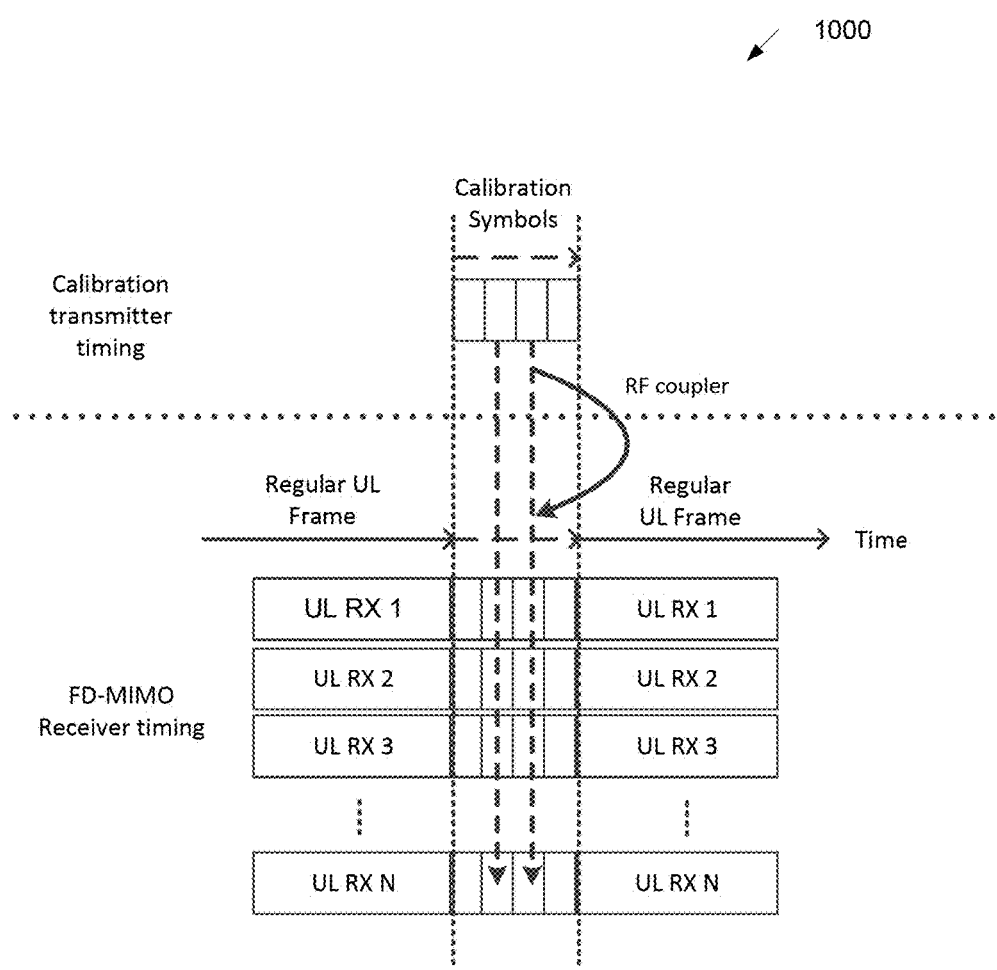
FIG. 10 illustrates an example Rx phase calibration according to embodiments of the present disclosure.

FIG. 10 illustrates an example Rx phase calibration 1000 according to embodiments of the present disclosure. An embodiment of the Rx phase calibration 1000 shown in FIG. 10 is for illustration only. Other embodiments may be used without departing from the scope of the present disclosure.

Figure 11:
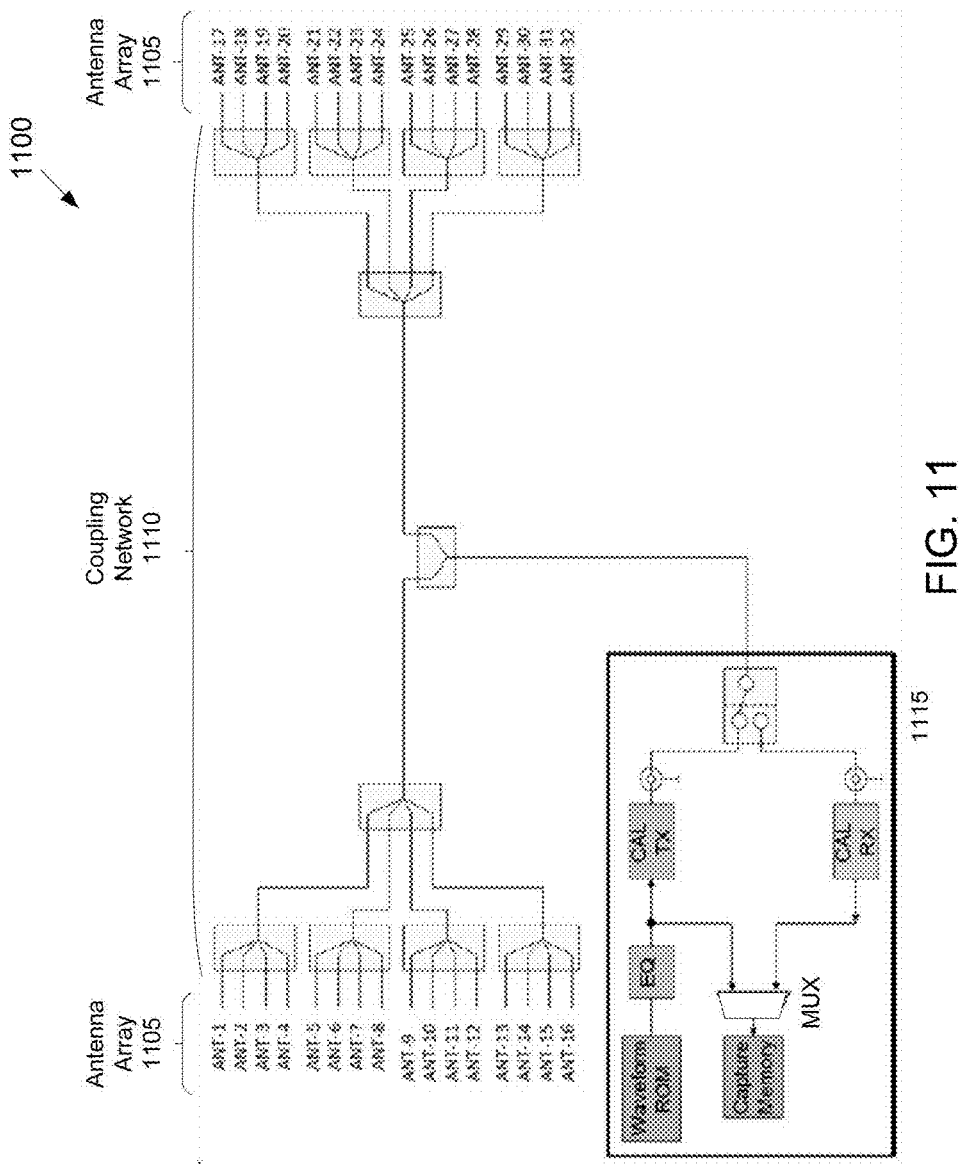
FIG. 11 illustrates an example coupling network according to embodiments of the present disclosure.

Rx calibration block diagram and procedure are illustrated for a 32 Rx antenna system in FIG. 10. 32 Rx receives the calibration signal at the same time. Each Rx converts its captured signal into frequency domain and fed into calibration algorithm block FIG. 11 illustrates an example coupling network 1100 according to embodiments of the present disclosure. An embodiment of the coupling network 1100 shown in FIG. 11 is for illustration only. Other embodiments may be used without departing from the scope of the present disclosure. As shown in FIG. 11, the network 1100 comprises a coupling network 1110 and an antenna array 1105, and is connected to a calibration transceiver 1115.

In some embodiments, coherent precoding requires high precision calibration on all antennas in array 1105 and can be attained by joint calibration via calibration transceiver 1115. However, virtualization requires Tx calibrations but with a few antennas. In some embodiments, hybrid calibration is designed to relax the design requirement for coupling network and save cost, meanwhile satisfying the precoding and antenna virtualization performance. In hybrid calibration, part of the coupling network 1100 is designed with high precision for Tx virtualization calibration purpose, while part of the coupling network 1100 can be any precision.

Figure 12:
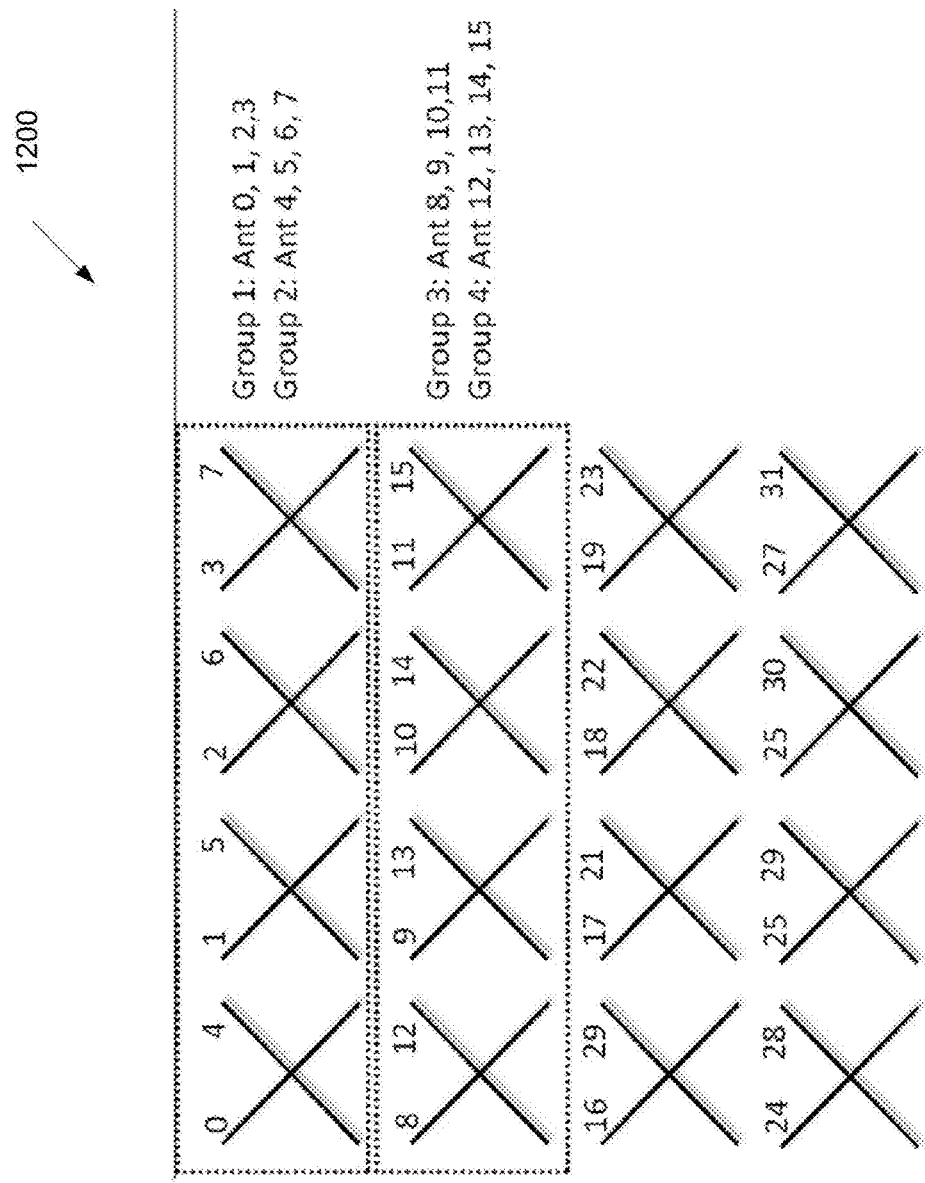
FIG. 12 illustrates an example antenna grouping in hybrid calibration according to embodiments of the present disclosure.

FIG. 12 illustrates an example antenna grouping 1200 in hybrid calibration according to embodiments of the present disclosure. An embodiment of the antenna grouping 1200 shown in FIG. 12 is for illustration only. Other embodiments may be used without departing from the scope of the present disclosure. As shown in FIG. 12, there are 4 groups of antennas where within each group the antennas are connected via a high precision 4-to-1 combiner. So after calibration, the phases of antennas within a group are well aligned. Among groups and other antennas, it is not necessarily true that the combiners have high precision so that the phases of these antennas may not be well aligned after calibration.

Figure 13:
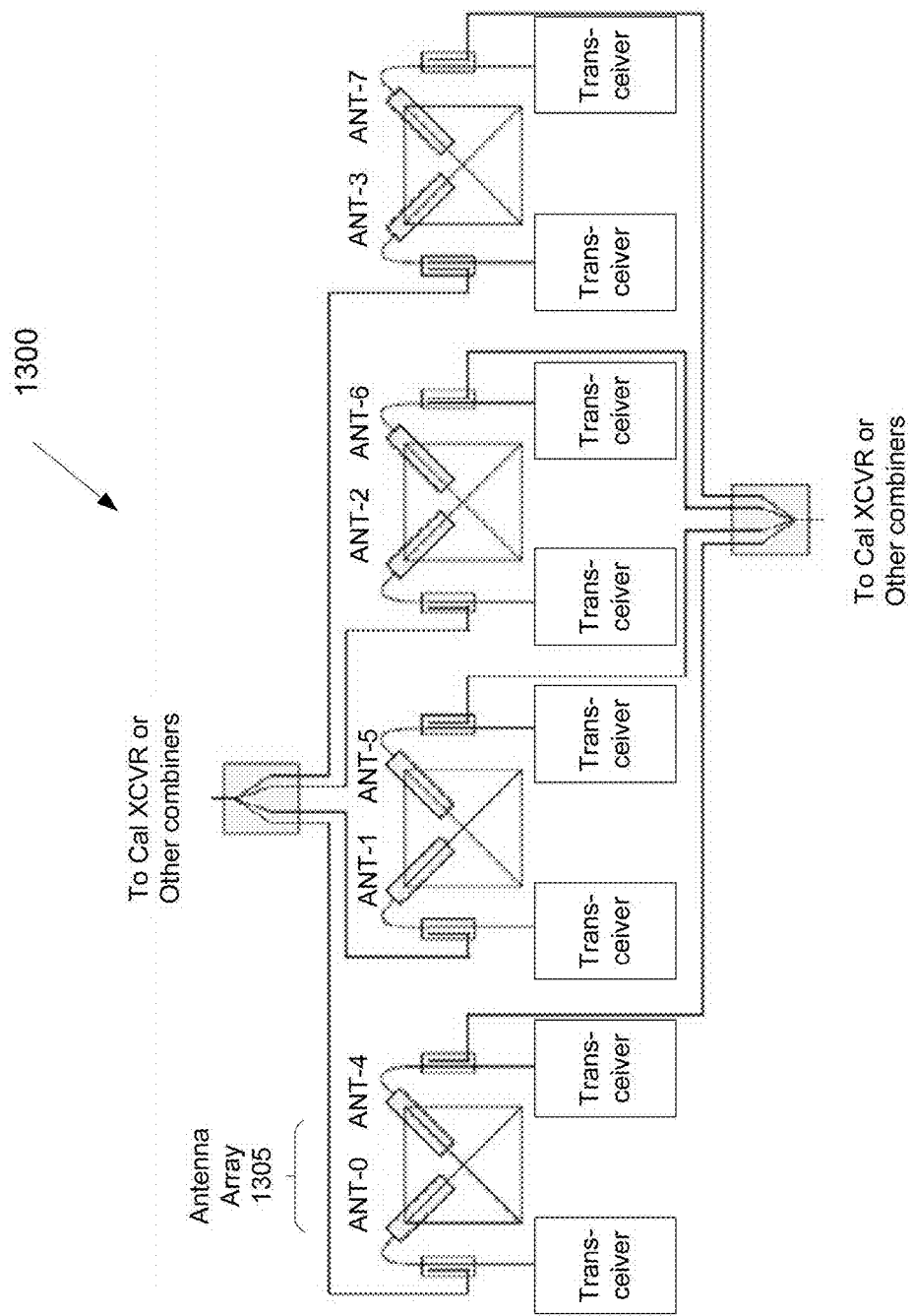
FIG. 13 illustrates an example coupling network in hybrid calibration according to embodiments of the present disclosure.

FIG. 13 illustrates an example coupling network 1300 in hybrid calibration according to embodiments of the present disclosure. An embodiment of the coupling network 1300 shown in FIG. 13 is for illustration only. Other embodiments may be used without departing from the scope of the present disclosure. As shown in FIG. 13, a corresponding coupling work is illustrated, which first connects antennas within a same group and then connects among groups. A shown in FIG. 13, the coupling network 1300 comprises an antenna array 1305.

Figure 14:
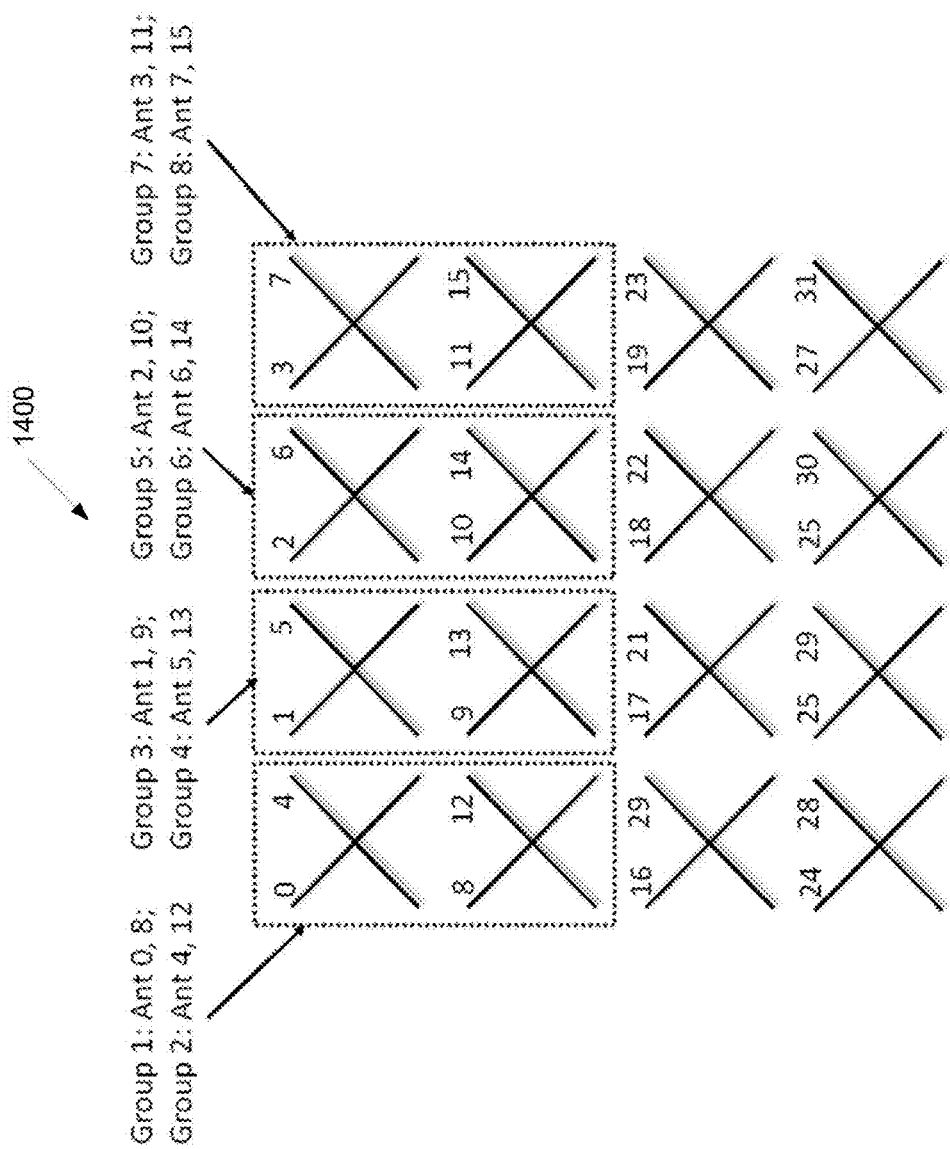
FIG. 14 illustrates example antenna groups for open loop beamforming and virtualization according to embodiments of the present disclosure.

FIG. 14 illustrates example antenna groups 1400 for open loop beamforming and virtualization according to embodiments of the present disclosure. An embodiment of the antenna groups 1400 for open loop beamforming and virtualization shown in FIG. 14 is for illustration only. Other embodiments may be used without departing from the scope of the present disclosure.

Figure 15:
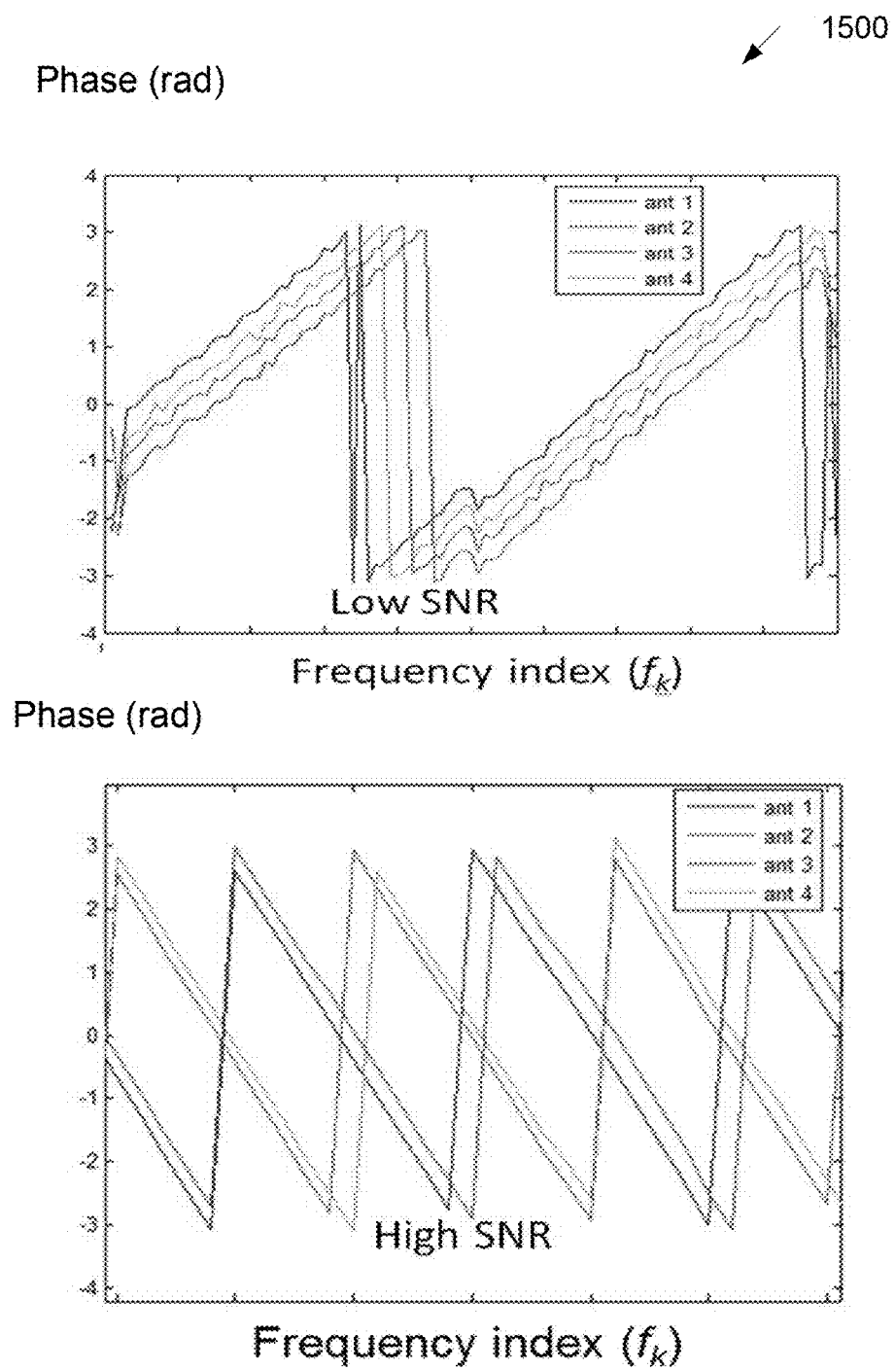
FIG. 15 illustrates example simulation results according to embodiments of the present disclosure.

FIG. 15 illustrates example simulation results 1500 according to embodiments of the present disclosure. An embodiment of the simulation results 1500 shown in FIG. 15 is for illustration only. Other embodiments may be used without departing from the scope of the present disclosure.

Figure 16:
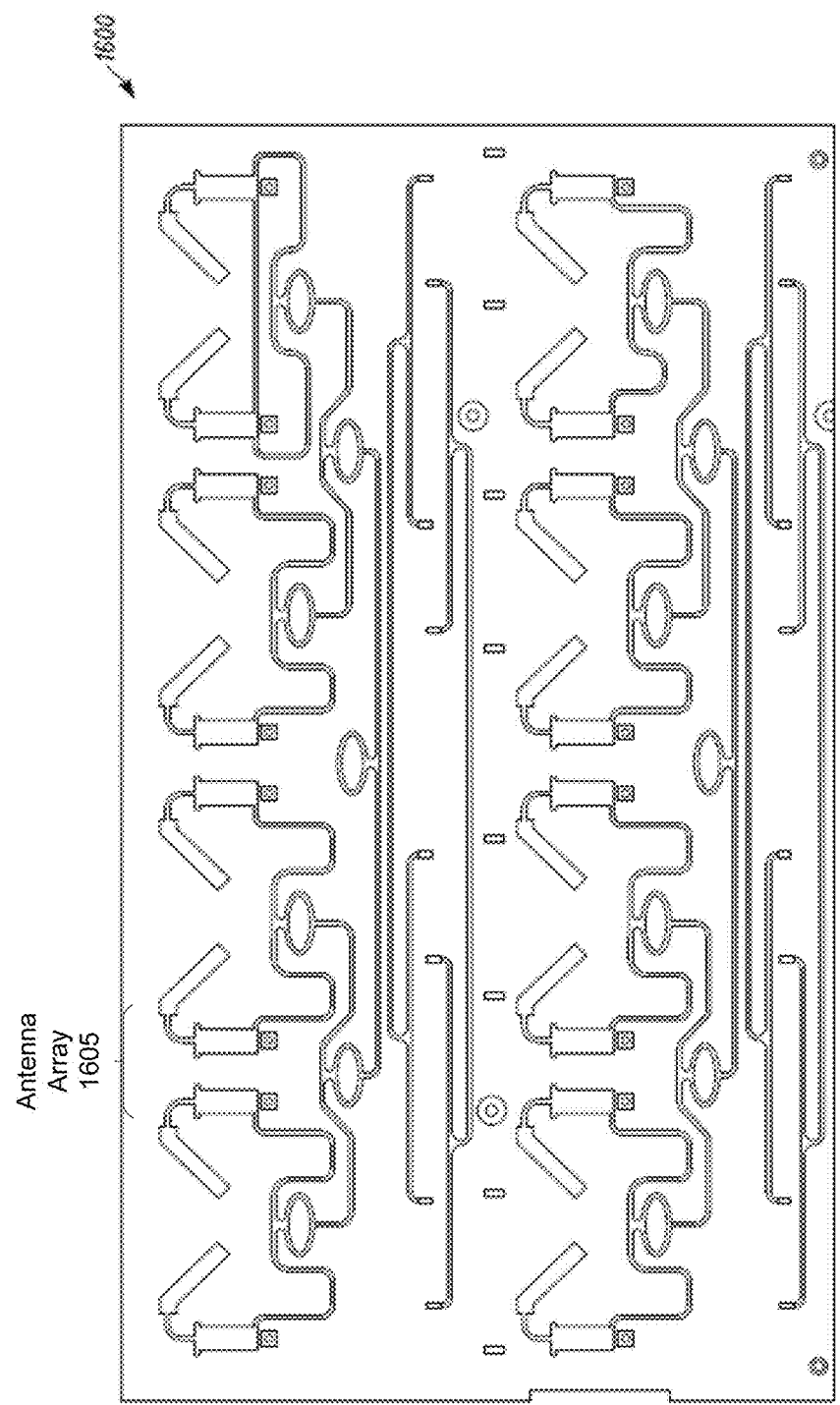
FIG. 16 illustrates another example coupling network according to embodiments of the present disclosure.

FIG. 16 illustrates another example coupling network 1600 according to embodiments of the present disclosure. An embodiment of the coupling network 1600 shown in FIG. 16 is for illustration only. Other embodiments may be used without departing from the scope of the present disclosure. As shown in FIG. 1600, the coupling network 1600 comprises an antenna array 1605.

In the exemplary hybrid calibration, 8 antenna groups may be used for open loop beamforming or antenna virtualization, where each group consists of 4 antennas in a column with the same polarization direction. Each of the 8 group of antennas may be regarded as an individual antenna in the open loop operation.

In some embodiments, the precoding (e.g., SLNR or MMSE precoding) can be represented by the format of $P=\alpha H^H(\Sigma+HH^H)^{-1}$ where $\Sigma=\text{diag}(\sigma_1, \ldots, \sigma_K)$ is a diagonal matrix called regularization matrix. The diagonal elements in E are non-negative and the relative value represents some weighting of different UEs' interference level. In one embodiment, each of the diagonal element in $\Sigma$ is the inverse of the receive SNR at the corresponding UE.

In some embodiments, the calibration SNRs are accounted to improve the precoding performance. For example, channels of some antennas may be measured with high SNR, however, due to the deficiency of the calibration circuit connected to these antennas, these antennas have bad calibration accuracy. Therefore, these antennas shall not be used to beamforming/precoding. In conventional precoding algorithms, only channel SNRs are accounted and therefore these channels will be heavily used. In the embodiment, the channel SNR will be scaled by calibration SNR to avoid such mis-alignment. In another embodiment, the precoding is represented as: $P=\alpha H^H(\Sigma+HDH^H)^{-1}$ where $D=\text{diag}(d_1, \ldots, d_K)$ is a diagonal matrix introduced to capture the RF quality of antennas.

For example, antenna 1 has very high noise or the calibration accuracy is very low, then one can set $d_1$ to be a relatively small number comparing to $d_i, i \neq 1$. In this case, the antenna 1 can have less weight or even effectively removed from the precoding design. In one embodiment, denote the calibration SNR (accuracy) for all antennas to be $\rho_{ci}$, where $i=1 \ldots M$. Then, D can be set to the relative calibration SNR:

$$D = \frac{\text{diag}(\rho_1, \ldots, \rho_M)}{\max_i \rho_{ci}}$$

In some embodiments, if the calibration SNR $\rho_{ci}$ is smaller than a certain threshold $\rho_{c0}$, the $\rho_{ci}=0$; otherwise, $\rho_{ci}=1$. In other words, $$\rho_{ci} = \begin{cases} 1, & \text{if } \rho_{ci} \geq \rho_{c0} \\ 0, & \text{if } \rho_{ci} < \rho_{c0} \end{cases}$$

Figure 17:
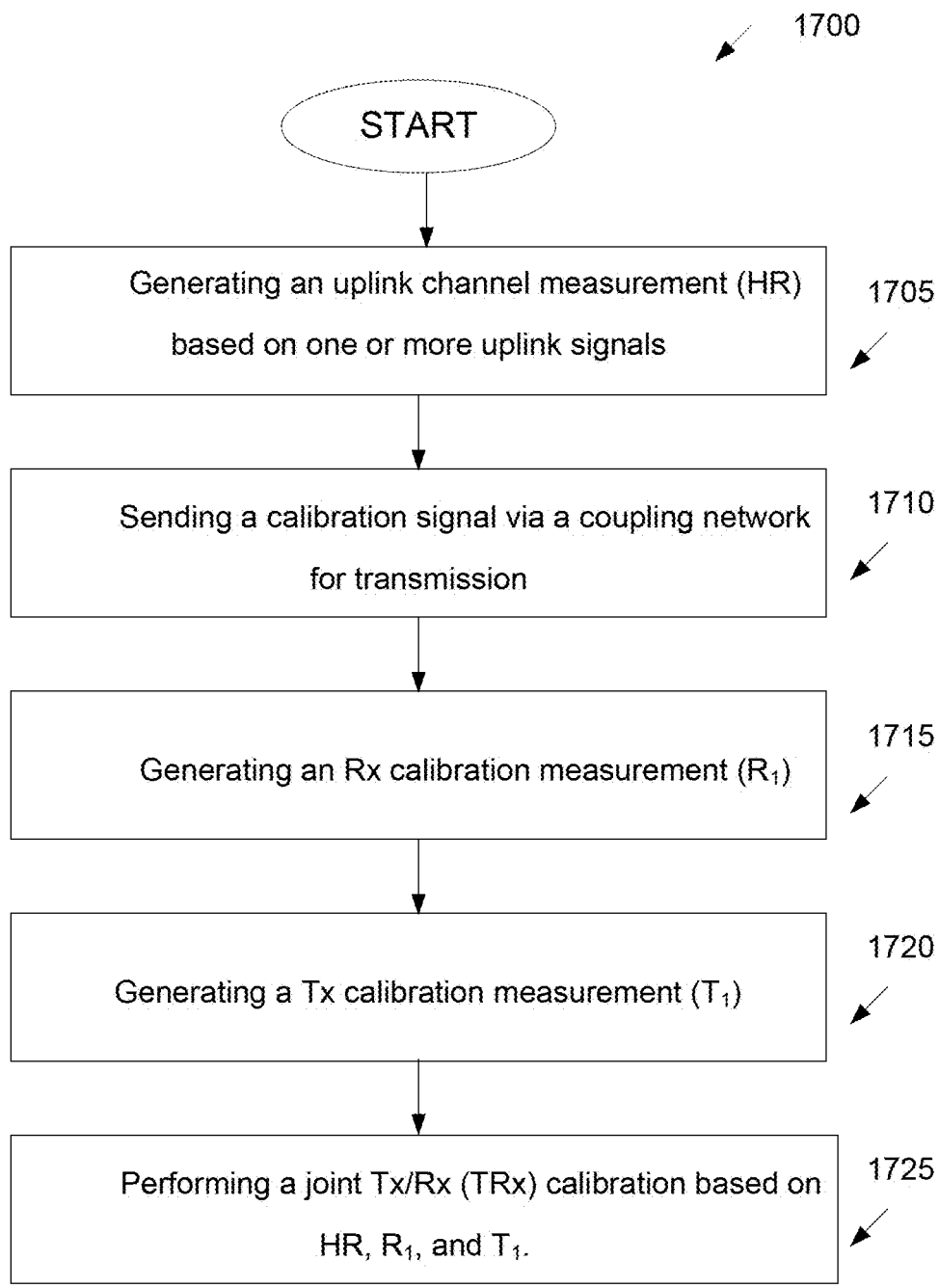
FIG. 17 illustrates an example flow chart of a method for calibration and array operation according to embodiments of the present disclosure.

FIG. 17 illustrates an example flow chart of a method 1700 for calibration and array operation according to embodiments of the present disclosure, as may be performed by a base station. An embodiment of the flow chart the method 1700 shown in FIG. 17 is for illustration only. Other embodiments may be used without departing from the scope of the present disclosure. As shown in FIG. 17, the method begins at step 1705. In step 1705, the method 1700 generates an uplink channel measurement (HR) based on one or more uplink signals received via an antenna array comprising a plurality of antennas. In some embodiments, the method 1700 generates a downlink channel estimate (HT) based on an equation of $HRR_1^{-1}T_1=HT$.

Next, the method in step 1710 send a calibration signal via a coupling network for transmission by each of the antennas in the antenna array. In some embodiments, the coupling network is connected to the antenna array that includes 32 antennas. In such embodiments, the coupling network comprises a multiple levels of layering structure including an equalizer, a multiplexer, a capture memory, and a waveform memory.

Subsequently, in step 1715, the method 1700 generates an Rx calibration measurement ($R_1$) based on the one or more uplink signals received via both the antenna array and the coupling network. In such embodiments, the $R_1$ comprises a product of an Rx array response (R) for a response of an Rx array comprising the plurality of antennas and a coupling network response (Ec) for a response of the coupling network. In such embodiments, the R, the Ec, and the T comprise a diagonal matrix, respectively. In some embodiments, the calibration signal is captured based on a sampling time. In such embodiments, the captured calibration signals for an antenna i and a frequency $f_k$ are determined by an equation given by: $y_{ki}=a\ exp(2\pi f_k\tau_i+\Phi_i)+n_{ki}$, k=1, ... , K where a is a calibration path gain and $n_{ki}$ is a noise.

Subsequently, the method 1700, in step 1720, generates a Tx calibration measurement ($T_1$) based on receipt of the calibration signal from each of the antennas via the coupling network. Finally, the method 1700 in step 1725 performs a joint Tx/Rx (TRx) calibration based on HR, $R_1$, and $T_1$. In such embodiments, the $T_1$ comprises a product of a Tx array response (T) for a response of an Tx array comprising the plurality of antennas and the Ec. In some embodiments, the method 1700 computes a zero-forcing (ZF) precoder based on an equation of $(HT)^{\dagger}$. In some embodiments, the TRx calibration is performed based on a calibration frame including 10 subframes each of which includes 1 millisecond long.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An apparatus for a transceiver calibration and antenna array operation in a multi-input multi-output (MIMO) system, the apparatus comprising:
   an antenna array comprising a plurality of antennas;
   a transceiver array comprising a plurality of transceivers electrically connected to one or more of the antennas, respectively;
   a coupling network electrically connected to each of the transceivers;
   a calibration transceiver electrically connected to each of the transceivers in the transceiver array via the coupling network at each antenna, the calibration transceiver including:
      a calibration transmitter (Tx) configured to send a first calibration signal via the coupling network, and
      a calibration receiver (Rx) configured to receive a second calibration signal that was sent by the transceiver array in a time division duplex (TDD) pattern via the coupling network,
   wherein the calibration transceiver is configured to:
      generate an Rx calibration measurement ($R_1$) based on the first calibration signal received by the transceiver array via the coupling network; and
      generate a Tx calibration measurement ($T_1$) based on receipt of the second calibration signal by the calibration receiver via the coupling network; and
   at least one processor configured to perform a joint Tx/Rx (TRx) calibration based on HR, $R_1$, and $T_1$, where H is a channel response in air interface, R is a channel response of receivers in transceiver array, wherein to perform the joint TRx calibration, the at least one processor is configured to generate a downlink channel estimate (HT) based on an equation of $HRR_1^{-1}T_1 = HT$.

2. The apparatus of claim 1, wherein the $R_1$, comprises a product of the channel response of the receivers in the transceiver array (R) and a channel response of the coupling network (Ec), and wherein the $T_1$ comprises a product of a channel response of transmitters in the transceiver array (T) and the channel response of the coupling network (Ec).

3. The apparatus of claim 2, wherein the transceiver array (R), the coupling network (Ec), and the transceiver array (T) comprise a diagonal matrix, respectively.

4. The apparatus of claim 3, wherein the transceiver array (R) is a diagonal matrix as given by $R=diag(g_{ri}exp(j\Phi_{ri}))$ where $g_{ri}$, and $\Phi_{ri}$ are a magnitude and a phase response of the receivers in the transceiver array, respectively.

5. The apparatus of claim 3, wherein the transceiver array (T) is a diagonal matrix as given by $T=diag(gt_{ti}exp(j\Phi_{ti}))$ where $g_{ti}$, and $\Phi_{ti}$, are a magnitude and a phase response of the transmitters in the transceiver array, respectively.

6. The apparatus of claim 3, wherein the coupling network ($E_c$) is a diagonal matrix as given by $E_c=diag(g_{ci}exp(j\Phi_{ci}))$ where $g_{ci}$ and $\Phi_{ci}$ are a magnitude and a phase response of channels in the coupling network, respectively.

7. The apparatus of claim 1, wherein the at least one processor is further configured to compute a precoder based on estimation of downlink channel state information (DL CSI).

8. The apparatus of claim 1, wherein the coupling network is connected to the transceiver array that includes multiple transceivers and the antenna array that includes multiple antennas at antenna ports.

9. The apparatus of claim 1, wherein an Rx calibration is computed based on the receivers in the transceiver array capturing the first calibration signal simultaneously, and wherein a Tx calibration is computed based on the calibration receiver receiving the second calibration signal in a one by one time pattern from transmitters in the transceiver array.

10. A method for transceiver calibration and antenna array operation in a multi-input multi-output (MIMO) system, the method comprising:
   sending, by a calibration transmitter (Tx), a first calibration signal via a coupling network that is electrically connected to each transceiver in a transceiver array, the transceiver array comprising a plurality of transceivers electrically connected to one or more of a plurality antennas, respectively, in the antenna array;
   receiving, by a calibration receiver (Rx), a second a calibration signal that was sent by the transceiver array in a time division duplex (TDD) pattern via the coupling network, the calibration receiver and calibration transmitter included in a calibration transceiver that is electrically connected to each of the transceivers in the transceiver array via the coupling network at each antenna;
   generating an Rx calibration measurement ($R_1$) based on the first calibration signal received by transceiver array via the coupling network;

generating a Tx calibration measurement ($T_1$) based on receipt of the second calibration signal by the calibration receiver via the coupling network;

performing a joint Tx/Rx (TRx) calibration based on HR, $R_1$, and $T_1$, where H is a channel response in air interface, R is a channel response of receivers in transceiver array; and generating a downlink channel estimate (HT) based on an equation of $HRR_1^{-1}T_1=HT$.

11. The method of claim 10, wherein the $R_1$ comprises a product of the channel response of the receivers in the transceiver array (R) and a channel response of the coupling network (Ec), and wherein the $T_1$ comprises a product of a channel response of transmitters in the transceiver array (T) and the channel response of the coupling network (Ec).

12. The method of claim 11, wherein the transceiver array (R), the coupling network (Ec), and the transceiver array (T) comprise a diagonal matrix, respectively.

13. The method of claim 12, wherein the transceiver array (R) is a diagonal matrix as given by $R=\text{diag}(g_{ri}\exp(j\Phi_{ri}))$ where $g_{ri}$, and $\Phi_{ri}$ are a magnitude and a phase response of the receivers in the transceiver array, respectively.

14. The method of claim 12, wherein the transceiver array (T) is a diagonal matrix as given by $T=\text{diag}(g_{ti}\exp(j_{ti}))$ where $g_{ti}$, and $\Phi_{ti}$ are a magnitude and a phase response of the transmitters in the transceiver array, respectively.

15. The method of claim 12, wherein the coupling network ($E_c$) is a diagonal matrix as given by $E_c=\text{diag}(g_{ci}\exp(j\Phi_{ci}))$ where $g_{ci}$ and $\Phi_{ci}$ are a magnitude and a phase response of channels in the coupling network, respectively.

16. The method of claim 10, further comprising computing a precoder based on estimation of downlink channel state information (DL CSI).

17. The method of claim 10, wherein the coupling network is connected to the transceiver array that includes multiple transceivers and the antenna array that includes multiple antennas at antenna ports.

18. The method of claim 10, wherein an Rx calibration is computed based on the receivers in the transceiver array capturing the first calibration signal simultaneously, and wherein a Tx calibration is computed based on the calibration receiver receiving the second calibration signal in a one by one time pattern from transmitters in the transceiver array.

* * * * *